(12) United States Patent
Kabasawa et al.

(10) Patent No.: US 10,401,939 B2
(45) Date of Patent: *Sep. 3, 2019

(54) ELECTRONIC APPARATUS AND CONTROL METHOD THEREFOR

(71) Applicant: Sony Corporation, Tokyo (JP)

(72) Inventors: Hidetoshi Kabasawa, Tokyo (JP); Kenji Hachisu, Tokyo (JP); Kazuyuki Yamamato, Tokyo (JP); Takashi Masuda, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/470,438

(22) Filed: Mar. 27, 2017

(65) Prior Publication Data

US 2017/0199562 A1    Jul. 13, 2017

Related U.S. Application Data

(63) Continuation of application No. 15/333,673, filed on Oct. 25, 2016, now Pat. No. 9,696,788, which is a (Continued)

(30) Foreign Application Priority Data

Jul. 9, 2007 (JP) .................. 2007-180205

(51) Int. Cl.
*H04Q 9/00* (2006.01)
*G06F 1/3234* (2019.01)
(Continued)

(52) U.S. Cl.
CPC .......... *G06F 1/3259* (2013.01); *G01C 17/28* (2013.01); *G06F 1/3203* (2013.01);
(Continued)

(58) Field of Classification Search
CPC .......... G06F 1/32; G06F 3/0346; G06F 3/038
See application file for complete search history.

(56) References Cited

U.S. PATENT DOCUMENTS 5,186,136 A 2/1993 Kadomukai et al.
5,453,758 A 9/1995 Sato
(Continued)

FOREIGN PATENT DOCUMENTS

EP 1 725 024 11/2006
JP 10-198509 7/1987
(Continued)

OTHER PUBLICATIONS

European Search Report dated Dec. 14, 2012 for corresponding European Appln. No. 08777955.9.
(Continued)

*Primary Examiner* — Shaheda A Abdin
(74) *Attorney, Agent, or Firm* — K&L Gates LLP

(57) ABSTRACT

An electronic apparatus and a control method are provided that are capable of reducing power consumption. The electronic apparatus having a normal mode in which first electric power is consumed and a power-saving mode in which second electric power lower than the first electric power is consumed includes a first sensor and a second sensor whose power consumption is lower than that of the first sensor. In the power-saving mode, supply of power to the first sensor is restricted, the second sensor is set to the power-saving mode, a trigger for restoring the power-saving mode to the normal mode is detected by using the second sensor set to the power-saving mode, and the power-saving mode is restored to the normal mode based on the detected trigger.

16 Claims, 26 Drawing Sheets

Related U.S. Application Data continuation of application No. 14/657,530, filed on Mar. 13, 2015, now Pat. No. 9,507,446, which is a continuation of application No. 14/524,084, filed on Oct. 27, 2014, now Pat. No. 9,019,204, which is a continuation of application No. 12/519,708, filed as application No. PCT/JP2008/062293 on Jul. 7, 2008, now Pat. No. 8,902,155.

(51) Int. Cl.
| | | |
|---|---|---|
| *G01C 17/28* | (2006.01) | |
| *G06F 1/3203* | (2019.01) | |
| *G06F 3/0346* | (2013.01) | |
| *G06F 3/038* | (2013.01) | |
| *H04W 52/02* | (2009.01) | |
| *G06F 1/3296* | (2019.01) | |

(52) U.S. Cl.
CPC ............ *G06F 1/3296* (2013.01); *G06F 3/038* (2013.01); *G06F 3/0346* (2013.01); *G06F 3/0383* (2013.01); *H04Q 9/00* (2013.01); *H04W 52/028* (2013.01); *H04W 52/0254* (2013.01); *G08C 2201/10* (2013.01); *H04M 2250/10* (2013.01); *H04M 2250/12* (2013.01); *H04Q 2209/883* (2013.01); *Y02D 70/164* (2018.01)

(56) References Cited

U.S. PATENT DOCUMENTS

| | | | | |
|---|---|---|---|---|
| 5,925,080 | A | * | 7/1999 | Shimbara ............. G05D 1/0244 180/168 |
| 2003/0028688 | A1 | * | 2/2003 | Tiphane ................ G02B 27/20 710/1 |
| 2005/0243062 | A1 | * | 11/2005 | Liberty .................. G06F 3/017 345/158 |
| 2007/0052177 | A1 | | 3/2007 | Ikeda et al. |
| 2007/0102525 | A1 | | 5/2007 | Orr et al. |

FOREIGN PATENT DOCUMENTS

| | | |
|---|---|---|
| JP | 2001-056743 | 2/2001 |
| JP | 2007-102370 | 4/2007 |
| WO | 2006/090197 | 8/2006 |

OTHER PUBLICATIONS

International Search Report dated Aug. 5, 2008, for corresponding Intl. Appln. No. PCT/JP2008/062293.

Japanese Office Action dated Oct. 16, 2012, for corresponding Japanese Appln. No. 2009-522643.

Extended European Search Report dated Apr. 12, 2017 for Application No. 17154078.4.

\* cited by examiner

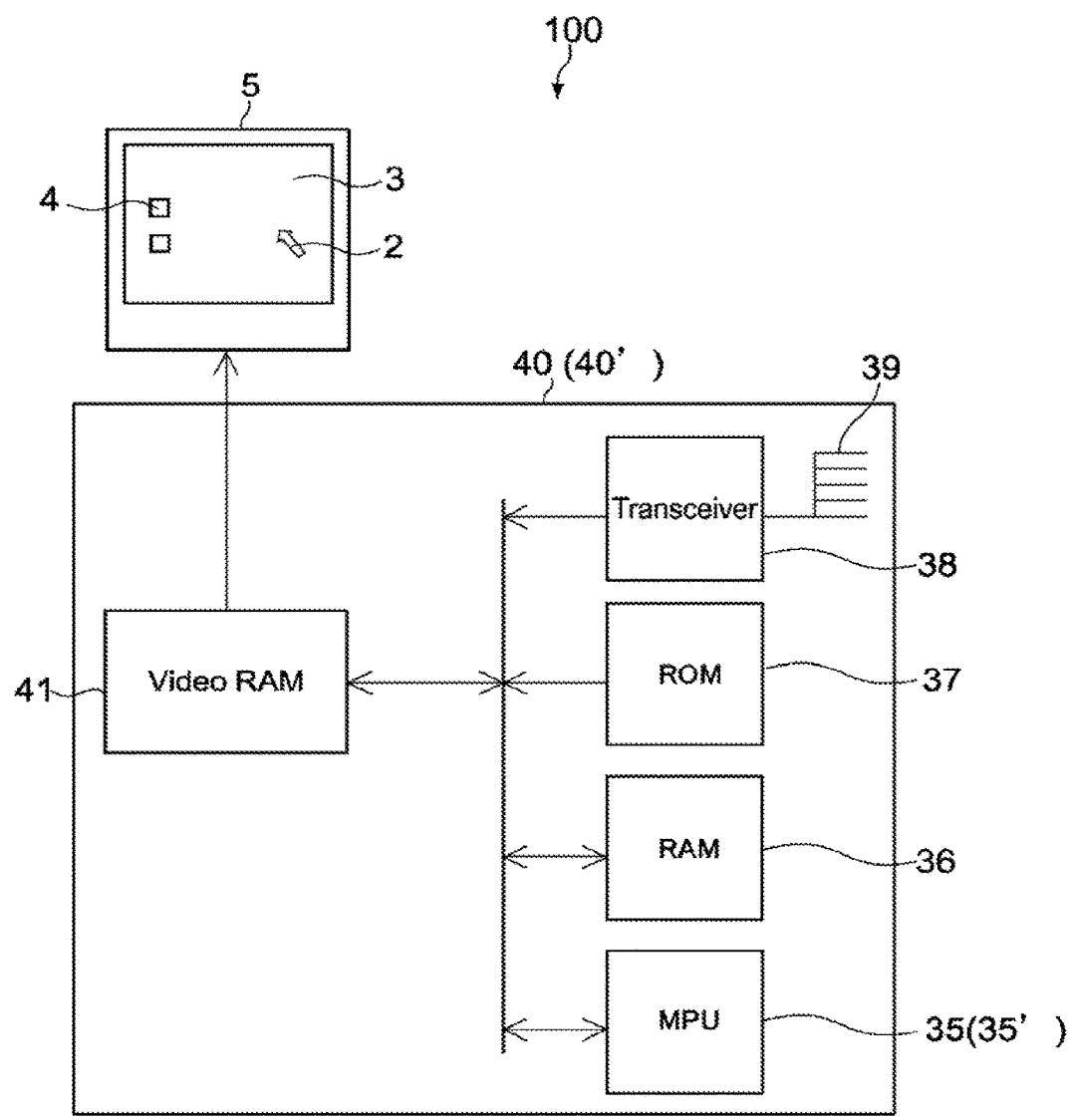
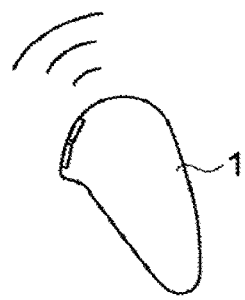
FIG.1

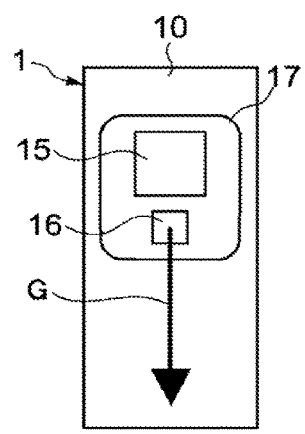
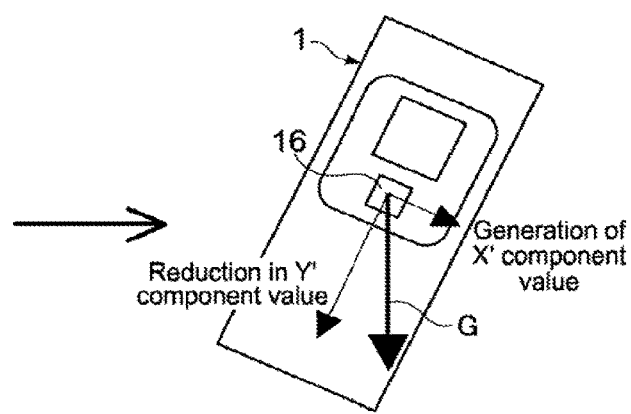
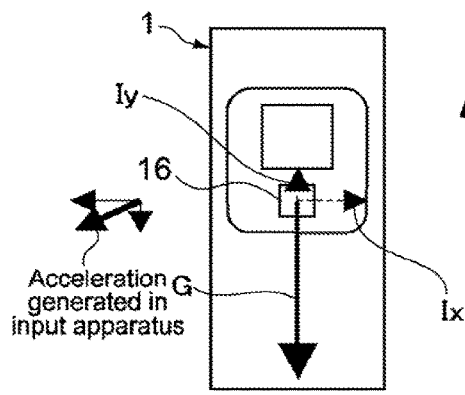
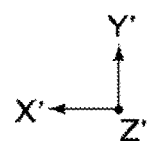
FIG.9A
FIG.9B
FIG.9C

| Transition source \ Transition destination | Initialization (Init) | Active (Active) | Sleep 1 (Sleep1) | Sleep 2 (Sleep2) | Power off (Power Off) |
|---|---|---|---|---|---|
| Initialization (Init) | | | | | |
| Active (Active) | | Active command from MPU 60 | Sleep 1 command from MPU 60 | Sleep 2 command from MPU 60 | Power off command from MPU 60 |
| Sleep 1 (Sleep1) | | Button event or motion event by user operation | | | |
| Sleep 2 (Sleep2) | | Button event by user operation | | | Power off command from MPU 60 |
| Power off (Power Off) | | | | | |

FIG.17

| Transition destination / Transition source | Initialization (Init) | Disconnect (Disconnect) | Active (Active) | Sleep 1 (Sleep1) | Sleep 2 (Sleep2) | Off (OFF) |
|---|---|---|---|---|---|---|
| Initialization (Init) | | MPU 50 initialization completion | | | | |
| Disconnect (Disconnect) | | | Success in connection of radio communication with PC side | | | Connection with PC side disabled for given time |
| Active (Active) | | Failure in connection of radio communication with PC side | | No report event for given time | | |
| Sleep 1 (Sleep1) | | | Report event from MPU 50 | | No report event for given time | |
| Sleep 2 (Sleep2) | | | Report event from MPU 50 | | | No report event for given time |
| Off (Off) | | | | | | |

FIG.18

| User operation | MPU 50 | | MPU 60 | |
| --- | --- | --- | --- | --- |
| | Operation mode | Event to cause mode transition | Operation mode | Event to cause mode transition |
| (1) Turning-on of power | Init | Power On Reset | Disconnect | Power On Reset |
| (2) Normal operation | Active | Active command from MPU 60 | Active | Establishment of connection of radio communication with PC |
| (3) Stationary (45 seconds) | Sleep1 | Sleep 1 command from MPU 60 | Sleep1 | Elapse of 30 seconds since becoming stationary |
| (4) Normal operation | Active | Motion event of acceleration sensor | Active | Report event from MPU 50 |
| (5) Stationary (2 minutes) | Sleep1 | Sleep 1 command from MPU 60 | Sleep1 | Elapse of 30 seconds since becoming stationary |
| | Sleep2 | Sleep 2 command from MPU 60 | Sleep2 | Elapse of 1 minute since becoming stationary |
| (6) Normal operation | Active | Button event by user operation | Active | Report event from MPU 50 |
| (7) Stationary (5 minutes) | Sleep1 | Sleep 1 command from MPU 60 | Sleep1 | Elapse of 30 seconds since becoming stationary |
| | Sleep2 | Sleep 2 command from MPU 60 | Sleep2 | Elapse of 1 minute since becoming stationary |
| | Power Off | Reception of power off command from MPU 60 | Off | Elapse of 5 minute since becoming stationary |

FIG.19

| User operation | MPU 50 | | MPU 60 | |
|---|---|---|---|---|
| | Operation mode | Event to cause mode transition | Operation mode | Event to cause mode transition |
| (1) Turning-on of power | Init | Power On Reset | Disconnect | Power On Reset |
| (2) Normal operation | Active | Active command from MPU 60 | Active | Establishment of connection of radio communication with PC |
| (3) Detachment of reception device | Active | | Disconnect | Failure in connection of radio communication with PC |
| (4) Stationary (5 minutes) Power off | Power Off | Reception of power off command from MPU 60 | Off | Connection with PC disabled for given time |

FIG.20

ELECTRONIC APPARATUS AND CONTROL METHOD THEREFOR

CROSS REFERENCE TO RELATED APPLICATIONS

The present application is a continuation of U.S. application Ser. No. 15/333,673, filed Oct. 25, 2016, which is a continuation of U.S. application Ser. No. 14/657,530, filed on Mar. 13, 2015, which is a continuation of U.S. application Ser. No. 14/524,084, filed Oct. 27, 2014, which is a continuation of U.S. application Ser. No. 12/519,708, filed Jun. 17, 2009, which is a National Stage of International Application No. PCT/JP2008/062293 filed on Jul. 7, 2008, and which claims priority to Japanese Patent Application No. 2007-180205 filed on Jul. 9, 2007, the entire contents of each of which are hereby incorporated by reference herein.

BACKGROUND

The present disclosure relates to an electronic apparatus such as a pointing device for 3-dimensional operations, a remote controller for 3-dimensional operations, and a cellular phone, and a control method therefor.

In the related art, pointing devices, particularly a mouse and a touchpad, are used as controllers for GUIs (Graphical User Interfaces) widely and mainly used in PCs (Personal Computers).

Not just as HIs (Human Interfaces) of PCs of the related art, the GUIs are now starting to be used as interfaces for AV equipment used in living rooms with televisions as image media. Examples of the HI of this type include a cross media bar, an EPG, an IP-TV, a windows Media Center, and the like.

As the HIs currently in wide use, there are remote controllers with arrow keys as extensions of remote controllers for AV equipment of the related art, for controlling the GUIs, but the operability thereof is poor since it is impossible to operate a cursor freely.

To solve this, a wireless mouse or the like may be used, but a table or the like to place the mouse becomes necessary for operating the mouse.

Patent Document 1 discloses "a 3-dimensional computer input apparatus performing 3-dimensional inputs to a computer, characterized by comprising: a direction sensing means for sensing changes in directions in space along three rotation axes (pitch, roll, and yaw); a displacement sensing means for sensing displacements along axes of at least two-dimensional coordinate systems out of an XYZ coordinate system set in a main body of the 3-dimensional computer input apparatus; and an electronic circuit connected to an input port of the computer, to convert output signals of the direction sensing means and the displacement sensing means so that the signals can be processed by the computer, and in that the direction sensing means is constituted of three gyroscopes corresponding to the three rotation axes (pitch, roll, and yaw), respectively, and the displacement sensing means is constituted of at least two acceleration sensors each corresponding to any of the XYZ axes". Accordingly, unlike the mouse, the table or the like becomes unnecessary, and operations in the air become possible.

In the past, a 3-dimensional mouse capable of being operated in the air has calculated a movement amount of a cursor on a PC (Personal Computer) screen from a complex movement of a hand that moves 3-dimensionally. Therefore, the 3-dimensional mouse needs to be equipped with sensors such as an acceleration sensor and an angular velocity sensor for detecting the hand movement (Patent Document 1).

Patent Document 1: Japanese Patent Publication No. Hei 6-7371 (claim 1 and claim 2)

However, because the 3-dimensional mouse as described in Patent Document 1 is equipped with many devices that consume more electric power than a desktop wireless mouse, it is difficult to suppress power consumption of the entire mouse and also prolong the battery life. An infrared sensor of the desktop wireless mouse only needs to detect values when the mouse is moving, but the acceleration sensor and the angular velocity sensor of the 3-dimensional mouse needs to constantly detect values. Moreover, a relatively large current flows into those sensors, and hence more delicate power consumption control than the desktop wireless mouse becomes necessary.

Pointing devices that are operated in the air as described above are expected to be used wirelessly from now on as a mainstream.

However, since the number of sensors becomes large in the pointing device that is operated in the air as described in Patent Document 1, electric power consumed increases when trying to use it wirelessly.

In view of the above-mentioned circumstances, it is desired an electronic apparatus and a control method therefor that are capable of reducing power consumption.

SUMMARY

According to an embodiment, there is provided an electronic apparatus including a normal mode in which first electric power is consumed and a power-saving mode in which second electric power lower than the first electric power is consumed, including: a first sensor; a second sensor whose power consumption is lower than that of the first sensor; means for restricting, in the power-saving mode, supply of power to the first sensor and setting the second sensor to the power-saving mode; means for detecting a trigger for causing the power-saving mode to be restored to the normal mode by using the second sensor set to the power-saving mode; and means for causing the power-saving mode to be restored to the normal mode based on the detected trigger.

In the electronic apparatus, in the power-saving mode, the supply of power to the first sensor is restricted, the second sensor is set to the power-saving mode, and the trigger for causing the power-saving mode to be restored to the normal mode is detected by using the second sensor set to the power-saving mode, whereby it becomes possible to reduce power consumption.

It is one preferred form that the electronic apparatus is a pointing device for 3-dimensional operations or a remote controller for 3-dimensional operations, the first sensor is a gyro sensor, and the second sensor is an acceleration sensor.

In the pointing device for 3-dimensional operations or the remote controller for 3-dimensional operations, a plurality of sensors such as the gyro sensor and the acceleration sensor are used, so the power consumption inevitably becomes higher. Here, the acceleration sensor is a passive type sensor and the gyro sensor is a sensor including a mechanically-vibrated vibrator. Therefore, the power consumption of the gyro sensor is higher than the power consumption of the acceleration sensor. The same holds true also when those sensors are operated in the power-saving mode. Hence, in the power-saving mode, the supply of power to the gyro sensor is restricted, the acceleration sensor is set to the power-saving mode, and the trigger for causing the power-saving mode to be restored to the normal mode is detected by using the acceleration sensor set to the power-saving mode, whereby it becomes possible to reduce the power consumption.

It is one preferred form that the electronic apparatus is a cellular phone or a portable terminal apparatus, the first sensor is a geomagnetic orientation sensor, and the second sensor is an acceleration sensor.

Similar to the above description, in the power-saving mode, the supply of power to the geomagnetic orientation sensor is restricted, the acceleration sensor is set to the power-saving mode, and the trigger for causing the power-saving mode to be restored to the normal mode is detected by using the acceleration sensor set to the power-saving mode, whereby it becomes possible to reduce power consumption.

According to another embodiment, there is provided an electronic apparatus equipped with a plurality of sensors each including a power-saving condition, including: means for performing control so that, in a power-saving mode of the electronic apparatus, a sensor whose power consumption in the power-saving condition is low out of the plurality of sensors is set to the power-saving condition, and supply of power to the remaining sensors is restricted; means for detecting a trigger for causing the power-saving mode to be restored to a normal mode by using the sensor set to the power-saving condition in the power-saving mode of the electronic apparatus; and means for causing the electronic apparatus to be restored from the power-saving mode to the normal mode based on the detected trigger.

In the electronic apparatus, in the power-saving mode of the electronic apparatus, out of the plurality of sensors, the sensor whose power consumption in the power-saving condition is low is set to the power-saving condition, the supply of power to the remaining sensors is restricted, and the trigger for causing the electronic apparatus to be restored from the power-saving mode to the normal mode is detected by using the sensor set to the power-saving condition, whereby it becomes possible to reduce the power consumption.

It is one preferred form that the electronic apparatus is a pointing device for 3-dimensional operations or a remote controller for 3-dimensional operations which is equipped with at least an acceleration sensor, and the sensor set to the power-saving condition in the power-saving mode is the acceleration sensor.

In the pointing device for 3-dimensional operations and the remote controller for 3-dimensional operations, a plurality of sensors including the acceleration sensor are used, so the power consumption thereof inevitably becomes larger. Here, the acceleration sensor is a passive type sensor whose power consumption is lower than those of the other sensors. In many cases, the same holds true also when those sensors are operated in the power-saving condition. Hence, in the power-saving mode, the supply of power to the other sensors is restricted, the acceleration sensor is set to the power-saving condition, and the trigger for causing the power-saving mode to be restored to the normal mode is detected by using the acceleration sensor set to the power-saving condition, whereby it becomes possible to reduce the power consumption.

It is one preferred form that the electronic apparatus includes a gyro sensor, and supply of power to the gyro sensor is restricted in the power-saving mode. The gyro sensor includes a mechanically-vibrated vibrator and its power consumption is higher than that of the acceleration sensor, so the power consumption can be effectively suppressed.

According to an embodiment, there is provided a method of controlling an electronic apparatus equipped with a plurality of sensors each including a power-saving condition, including: performing control so that, in a power-saving mode of the electronic apparatus, a sensor whose power consumption in the power-saving condition is low out of the plurality of sensors is set to the power-saving condition, and supply of power to the remaining sensors is restricted; detecting a trigger for causing the power-saving mode to be restored to a normal mode by using the sensor set to the power-saving condition in the power-saving mode; and causing the electronic apparatus to be restored from the power-saving mode to the normal mode based on the detected trigger.

In the control method, in the power-saving mode, out of the plurality of sensors, the sensor whose power consumption in the power-saving condition is low is set to the power-saving condition, the supply of power to the remaining sensors is restricted, and the trigger for causing the power-saving mode to be restored to a normal mode is detected by using the sensor set to the power-saving condition, whereby it becomes possible to reduce the power consumption.

It is one preferred form that the electronic apparatus is a pointing device for 3-dimensional operations or a remote controller for 3-dimensional operations which is equipped with at least an acceleration sensor, and the sensor set to the power-saving condition in the power-saving mode is the acceleration sensor.

In the pointing device for 3-dimensional operations and the remote controller for 3-dimensional operations, a plurality of sensors including the acceleration sensor are used, so the power consumption thereof inevitably becomes larger. Here, the acceleration sensor is a passive type sensor whose power consumption is lower than those of the other sensors. The same holds true also when those sensors are operated in the power-saving mode. Hence, in the power-saving mode, the supply of power to the other sensors is restricted, the acceleration sensor is set to the power-saving mode, and the trigger for causing the power-saving mode to be restored to the normal mode is detected by using the acceleration sensor set to the power-saving mode, whereby it becomes possible to reduce the power consumption.

It is one preferred form that the electronic apparatus includes a gyro sensor, and supply of power to the gyro sensor is restricted in the power-saving mode. The gyro sensor includes a mechanically-vibrated vibrator and its power consumption is higher than that of the acceleration sensor, so the power consumption can be effectively suppressed.

To solve the problem above, an electronic apparatus according to an embodiment includes a casing, a detection section, a power supply section, and a control means.

The detection section includes a first sensor and a second sensor whose power consumption is lower than that of the first sensor, and detects a movement of the casing by using the first sensor and the second sensor. The power supply section supplies power to the first sensor and the second sensor. The control means includes a normal mode in which the power is supplied to the first sensor and the second sensor, a first power-saving mode in which the supply of the power to the first sensor is cut off and the power is supplied to the second sensor, and a second power-saving mode in which the supply of the power to the first sensor and the second sensor is cut off, and makes transitions from the normal mode to the first power-saving mode and the second power-saving mode based on an output of the detection section.

In the electronic apparatus, the control means includes the normal mode, the first power-saving mode, and the second power-saving mode. The power consumption in the first power-saving mode is lower than that in the normal mode, and the power consumption in the second power-saving mode is lower than that in the first power-saving mode. Moreover, whether or not the casing is being operated can be judged based on the output of the detection section. Therefore, it becomes possible to reduce the power consumption of the electronic apparatus by making transitions to the respective modes based on the output of the detection section.

The electronic apparatus may further include a restoration means. The restoration means includes a first restoration mode for causing, based on an output of the second sensor, the control means to be restored from the first power-saving mode to the normal mode. Accordingly, a restoration to the normal mode becomes possible even in a condition where the power supply to the first sensor is cut off.

The control means may further include a third power-saving mode in which the supply of power from the power supply section to the control means is cut off.

Accordingly, additional power saving of the electronic apparatus can be achieved.

The control means may make a transition from the normal mode to the first power-saving mode when judging, based on the output of the detection section, that the casing has not been operated over a first time period.

Accordingly, an appropriate shift to the first power-saving mode can be made when the electronic apparatus is not used.

The control means may make a transition from the first power-saving mode to the second power-saving mode when judging, based on the output of the detection section, that the casing has not been operated over a second time period longer than the first time period.

Accordingly, an appropriate shift to the second power-saving mode can be made when the electronic apparatus is not used.

The control means may make a transition from the normal mode to the first power-saving mode when judging, based on the output of the detection section, that the casing has not been operated over a first time period, make a transition from the first power-saving mode to the second power-saving mode when judging that the casing has not been operated over a second time period longer than the first time period, and make a transition from the second power-saving mode to the third power-saving mode when judging that the casing has not been operated over a third time period longer than the second time period.

Accordingly, an appropriate shift to the third power-saving mode can be made when the electronic apparatus is not used.

In the first power-saving mode, the second sensor may be in a power-saving condition.

In the first power-saving mode, the second sensor only needs to be in a condition capable of detecting a relatively large movement of the electronic apparatus. Accordingly, it becomes possible to enhance a power-saving effect.

The control means may include a microprocessor unit (MPU), and in the second power-saving mode, the microprocessor unit may be in a power-saving condition.

Accordingly, in the second power-saving mode, power consumption in the microprocessor unit can be cut down.

The electronic apparatus may further include a first input operation section. An input operation is made to the first input operation section by a user. The restoration means may further include a second restoration mode for causing, based on the input operation to the first input operation section, the control means to be restored from the second power-saving mode to the normal mode.

Accordingly, the control means can be restored to the normal mode based on the input operation to the input operation section.

The electronic apparatus may further include a second input operation section and a restoration means. The second input operation section is cable of being operated by a user. The restoration means includes a third restoration mode for causing, based on the input operation to the second input operation section, the control means to be restored from the third power-saving mode to the normal mode.

Accordingly, the control means can be restored from the third power-saving mode to the normal mode based on the input operation to the second input operation section.

The electronic apparatus may be a pointing device for 3-dimensional operations or a remote controller for 3-dimensional operations. In this case, the first sensor may be a gyro sensor, and the second sensor may be an acceleration sensor.

Accordingly, it becomes possible to achieve power saving of the pointing device or the remote controller.

The electronic apparatus may be a cellular phone or a portable terminal apparatus. In this case, the first sensor may be a geomagnetic orientation sensor, and the second sensor may be an acceleration sensor. Instead of the geomagnetic orientation sensor, a gyro sensor can be used.

Accordingly, it becomes possible to achieve power saving of the cellular phone or the terminal apparatus.

According to another embodiment, there is provided a method of controlling an electronic apparatus including a first sensor and a second sensor whose power consumption is lower than that of the first sensor. When the electronic apparatus has not been operated over a first time period, the electronic apparatus is caused to make a transition from a normal mode in which power is supplied to the first sensor and the second sensor to a first power-saving mode in which the supply of the power to the first sensor is cut off. When the electronic apparatus has not been operated over a second time period longer than the first time period, the electronic apparatus is caused to make a transition to a second power-saving mode in which the supply of the power to the first sensor and the second sensor is cut off. When an input operation to the electronic apparatus is detected while the second power-saving mode is being executed, the electronic apparatus is restored from the second power-saving mode to a normal mode in which the power is supplied to the first sensor and the second sensor.

The power consumption in the first power-saving mode is lower than that in the normal mode, and the power consumption in the second power-saving mode is lower than that in the first power-saving mode. Therefore, it becomes possible to reduce the power consumption of the electronic apparatus by causing the electronic apparatus to make transitions to the respective modes according to a usage condition of the electronic apparatus. Moreover, it is possible to restore the electronic apparatus from the second power-saving mode to the normal mode based on the input operation to the input operation section even in a condition where the power supply to the first and second sensors is cut off.

When an operation performed by a user on the electronic apparatus is detected while the first power-saving mode is being executed, the electronic apparatus may be restored from the first power-saving mode to the normal mode.

Accordingly, the first power-saving mode can appropriately be restored to the normal mode according to the usage condition of the electronic apparatus.

When the electronic apparatus has not been operated over a third time period longer than the second time period, the electronic apparatus may be caused to make a transition to a third power-saving mode in which power to the electronic apparatus is cut off.

Accordingly, additional power saving of the electronic apparatus can be achieved.

As described above, according to the embodiments, it becomes possible to reduce power consumption of an electronic apparatus.

Additional features and advantages are described herein, and will be apparent from, the following Detailed Description and the figures.

BRIEF DESCRIPTION OF THE FIGURES

FIG. 1 is a diagram showing a control system according to an embodiment.

FIGS. 9A, 9B, and 9C are diagrams showing the input apparatus seen from a Z' direction.

FIG. 17 is a diagram showing transition conditions of operation modes of the MPU 50.

FIG. 18 is a diagram showing transition conditions of operation modes of the MPU 60.

FIG. 19 is a diagram showing Example 1 of operation mode transitions of the input apparatus.

FIG. 20 is a diagram showing Example 2 of the operation mode transitions of the input apparatus.

DETAILED DESCRIPTION

Figure 2:
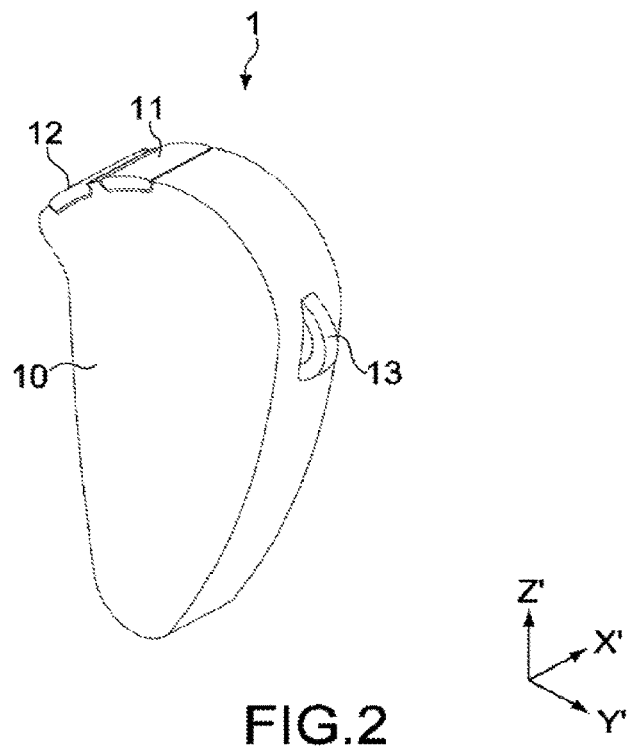
FIG. 2 is a perspective diagram showing an input apparatus.

Hereinafter, embodiments will be described with reference to the drawings.

FIG. 1 is a diagram showing a control system according to an embodiment. A control system 100 includes a display apparatus 5, a control apparatus 40, and an input apparatus 1.

As shown in FIG. 1, the control apparatus 40 is a computer and includes an MPU 35 (or CPU), a RAM 36, a ROM 37, a transceiver 38, an antenna 39, a video RAM 41, and the like.

The transceiver 38 receives a control signal transmitted from the input apparatus 1 via the antenna 39. The transceiver 38 also has a transmitting function and is capable of performing two-way communication with the input apparatus 1. The transceiver 38 is detachable from the control apparatus 40, for example.

The MPU 35 performs, based on the control signal, an operation for controlling the movement of a pointer (cursor) 2 displayed on a screen 3 of the display apparatus 5 or an operation for controlling execution of an icon 4. Accordingly, a display control signal for controlling a UI displayed on the screen 3 of the display apparatus 5 is generated.

The video RAM 41 stores screen data generated in response to the display control signal and that is to be displayed on the display apparatus 5.

The control apparatus 40 may be an apparatus dedicated to the input apparatus 1, or may be a personal computer (PC) or the like. The control apparatus 40 is not limited to the PC, and may be a computer integrally formed with the display apparatus 5, an audio/visual equipment, a projector, a game device, a car navigation device, or the like.

FIG. 2 is a perspective diagram showing the input apparatus 1. The input apparatus 1 is a pointing device (electronic apparatus) for 3-dimensional operations used for inputting information to the display apparatus 5. The input apparatus 1 is of a size that a user is capable of holding. As shown in FIG. 2, the input apparatus 1 includes a casing 10 and operation sections such as three buttons 11, 12, and 13 provided at an upper portion of the casing 10.

The button 11 is provided closer to the center of the upper portion of the casing 10 and functions as, for example, a left button of a mouse as an input device for a PC. A file is executed by double-clicking the button 11. A "drag and drop" operation can be performed by moving the input apparatus while pressing the button 11.

The button 12 is adjacent to the button 11 and functions as a right button of a mouse. Various option operations can be made, for example.

The button 13 is a button used for switching effectiveness/ineffectiveness of a function of recognizing a movement of the input apparatus 1 and the like. The button 13 is a rotatable button and can scroll the screen by its rotation. Locations of the buttons 11, 12, and 13, a content of a command issued, and the like can arbitrarily be changed.

Figure 3:
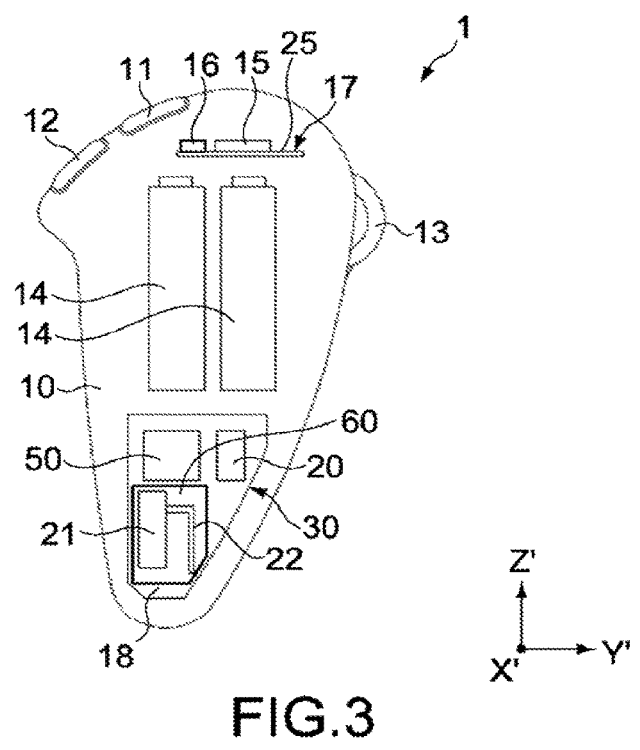
FIG. 3 is a diagram schematically showing an internal structure of the input apparatus.

FIG. 3 is a diagram schematically showing an internal structure of the input apparatus 1. In descriptions given with reference to FIGS. 2 and 3, a longitudinal direction of the casing 10 is referred to as Z' direction, a thickness direction of the casing 10 is referred to as X' direction, and a width direction of the casing 10 is referred to as Y' direction for convenience.

As shown in FIG. 3, the input apparatus 1 includes a control unit 30, a sensor unit 17, and batteries 14.

The control unit 30 includes a main substrate 18, MPUs 50 and 60 (Micro Processing Units) (or CPUs) mounted on the main substrate 18, a crystal oscillator 20, a transceiver 21, and an antenna 22 printed on the main substrate 18.

Figure 4:
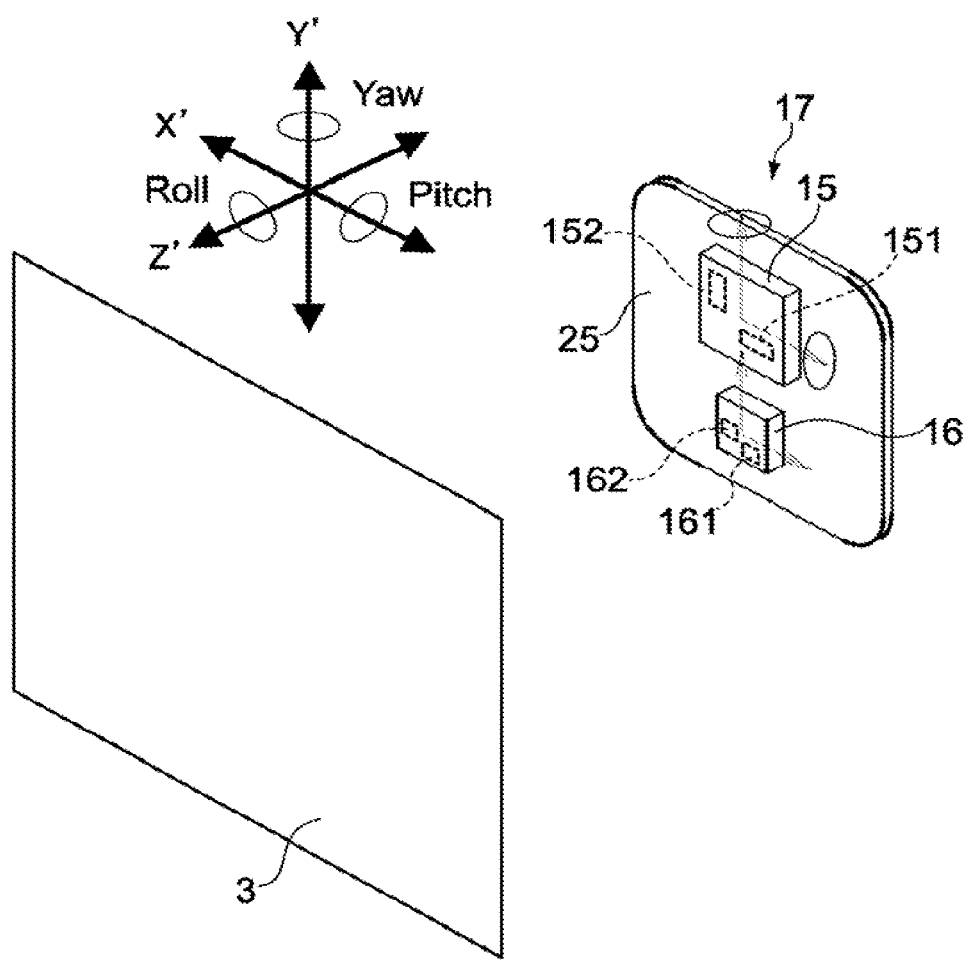
FIG. 4 is a perspective diagram showing a sensor unit.

FIG. 4 is a perspective diagram showing the sensor unit 17 (detection section). The sensor unit 17 includes a circuit board 25, an angular velocity sensor (gyro sensor) unit 15, and an acceleration sensor unit 16.

The angular velocity sensor (gyro sensor) unit 15 detects angular velocities about two axes crossing each other, that is, two orthogonal axes, for example. The acceleration sensor unit 16 detects accelerations along two axes crossing each other, that is, two orthogonal axes (X' axis and Y' axis), for example. It should be noted that detection axes of the angular velocity sensor unit 15 and detection axes of the acceleration sensor unit 16 are not necessarily the same, and may be disposed at angles at which the detection axes cross each other.

The angular velocity sensor unit 15 includes two sensors, that is, a first angular velocity sensor 151 and a second angular velocity sensor 152. The acceleration sensor unit 16 includes two sensors, that is, a first acceleration sensor 161 and a second acceleration sensor 162. Moreover, these angular velocity sensor unit 15 and acceleration sensor unit 16 are packaged and mounted on the circuit board 25.

As each of the first and second angular velocity sensors 151 and 152, a vibration gyro sensor for detecting Coriolis force proportional to an angular velocity is used. As each of the first and second acceleration sensors 161 and 162, any sensor such as a piezoresistive sensor, a piezoelectric sensor, or a capacitance sensor may be used.

The sensor unit 17 is incorporated into the casing 10 such that a surface of the circuit board 25 on which the angular velocity sensor unit 15 and the acceleration sensor unit 16 are mounted is substantially in parallel with an X'-Y' plane, and the sensor units 15 and 16 each detect physical amounts with respect to the two axes, that is, the X' axis and the Y' axis. In descriptions below, with regard to the movement of the input apparatus 1, a rotational direction about the X' axis is sometimes referred to as pitch direction, a rotational direction about the Y' axis is sometimes referred to as yaw direction, and a rotational direction about the Z' axis is sometimes referred to as roll direction.

Figure 5:
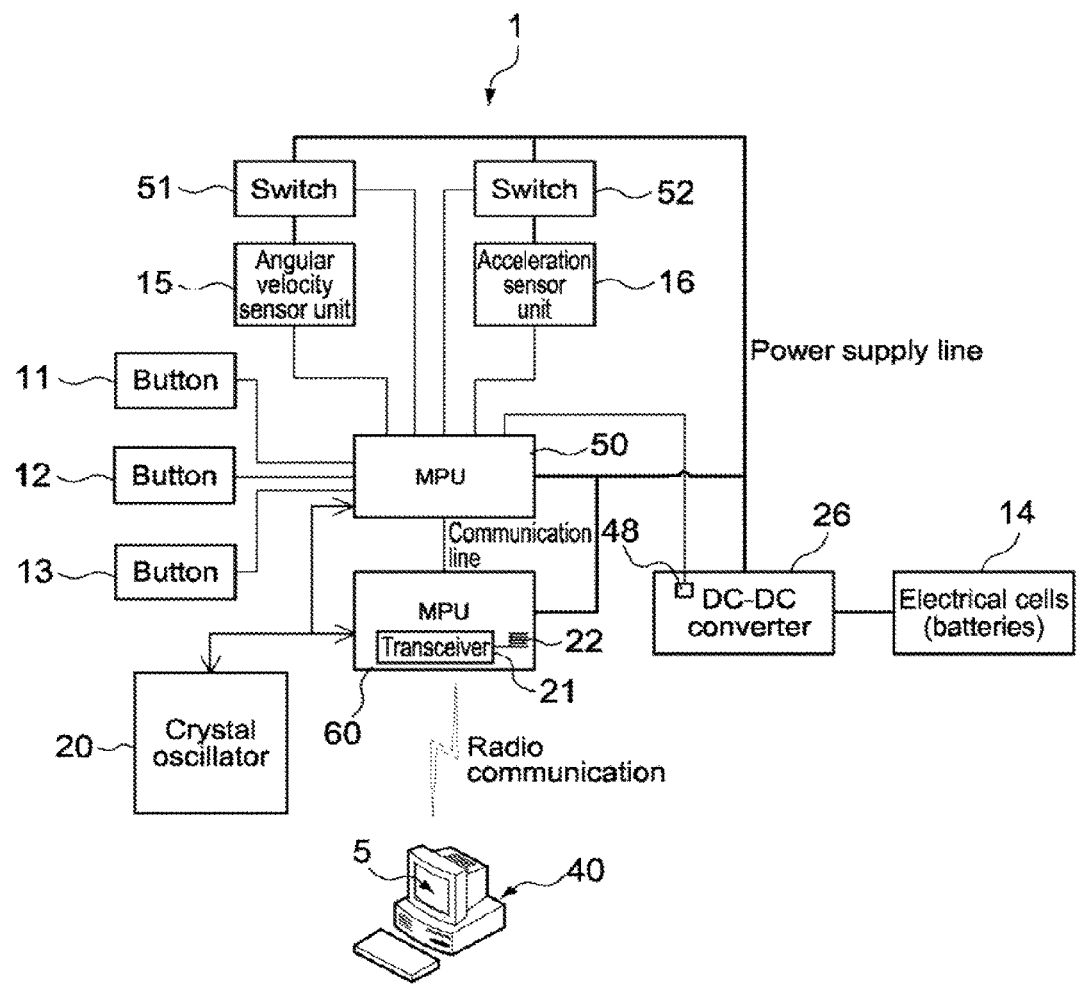
FIG. 5 is a block diagram showing an electrical structure of the input apparatus.

FIG. 5 is a block diagram showing an electrical structure of the input apparatus 1. As shown in the figure, the input apparatus 1 includes the buttons 11, 12, and 13 (first input operation section), the angular velocity sensor unit 15, the acceleration sensor unit 16 (up to here, detection section), the MPU 50, the MPU 60, switches 51 and 52, the crystal oscillator 20, a DC-DC converter 26 (up to here, control means or restoration means), and electric cells (batteries) 14 (power supply section).

The input apparatus 1 is powered by the batteries 14. As the batteries 14, dry cell batteries, rechargeable batteries, or the like are used.

The DC-DC converter 26 supplies power to the angular velocity sensor unit 15, the acceleration sensor unit 16, and the MPUs 50 and 60 while keeping power supply voltages of the batteries 14 at a constant voltage. The DC-DC converter 26 includes a shutdown switch 48. The shutdown switch 48 is a switch for turning off the power supply to the entire system of the input apparatus 1.

The crystal oscillator 20 generates clocks and supplies them to the MPUs 50 and 60.

Based on detection signals of the angular velocity sensor unit 15 and the acceleration sensor unit 16, the MPU 50 calculates velocity values and outputs those velocity values to the MPU 60 (movement value generation means). The MPU 50 manages input signals from the buttons 11, 12, and 13 and outputs input information to the MPU 60.

The MPU 50 executes operation modes of the angular velocity sensor unit 15, the acceleration sensor unit 16, and the MPU 50 itself in response to commands (commands for transitions of operation modes) to be described later from the MPU 60 (execution means). The MPU 50 switches on/off of the switch 51 and the switch 52 according to the operation mode to be executed. When the switch 51 is on, the power is supplied from the DC-DC converter 26 to the angular velocity sensor unit 15, and when the switch 51 is off, the supply of power is cut off. When the switch 52 is on, the power is supplied from the DC-DC converter 26 to the acceleration sensor unit 16, and when the switch 52 is off, the supply of power is cut off. It should be noted that the switch 51 may be incorporated into the angular velocity sensor unit 15, or the switch 52 may be incorporated into the acceleration sensor unit 16.

The MPU 50 outputs a power off command to the shutdown switch 48 based on a predetermined command from the MPU 60, and turns off the power supply to the entire system of the input apparatus 1.

The MPU 60 judges a usage condition of the input apparatus 1 based on a signal from the MPU 50 (judgment means). That is, based on the velocity values and the signals from the buttons 11, 12, and 13 transmitted from the MPU 50, the MPU 60 makes a judgment between a first condition where the input apparatus 1 is being operated and a second condition where the input apparatus 1 is not operated.

The MPU 60 transmits a result of the judgment to the MPU 50. The MPU 60 makes a transition of an operation mode of the MPU 60 itself based on this judgment result.

The MPU 60 outputs the velocity values and the signals from the buttons 11, 12, and 13 transmitted from the MPU 50 as RF radio signals to the control apparatus 40 via the antenna 22 by means of the transceiver 21. The transceiver 21 also functions as a receiver for receiving the signals transmitted from the control apparatus 40.

Figure 6:
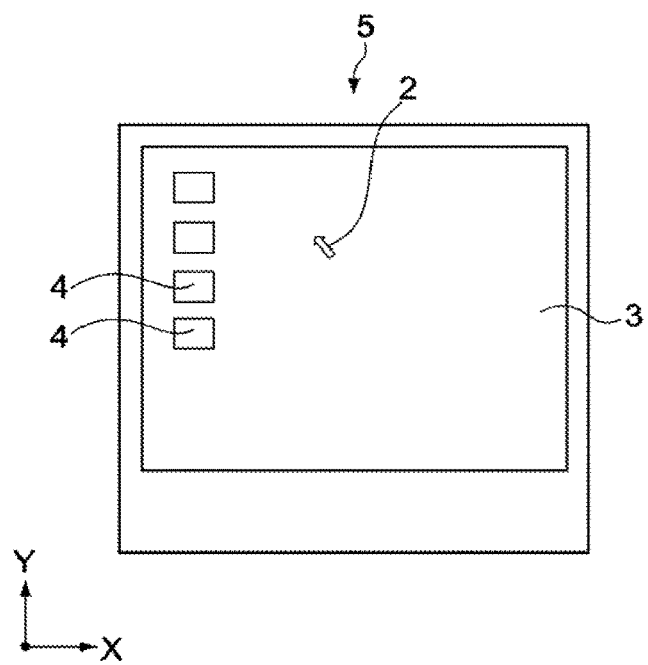
FIG. 6 is a diagram showing an example of a screen displayed on a display apparatus.

FIG. 6 is a diagram showing an example of the screen 3 displayed on the display apparatus 5. Examples of the display apparatus 5 include a liquid crystal display and an EL (Electro-Luminescence) display, but are not limited thereto. The display apparatus 5 may alternatively be an apparatus integrally formed with a display and capable of receiving television broadcasts and the like. To help understand descriptions below, the UI to be an operation target of the input apparatus 1 will be described as being the pointer (cursor) 2 unless otherwise specified.

UIs such as the icons 4 and the pointer 2 are displayed on the screen 3. The icons are obtained by imaging program functions, execution commands, file contents, and the like of a computer on the screen 3. It should be noted that the horizontal direction of the screen 3 is set as an X-axis direction and the vertical direction thereof is set as a Y-axis direction.

Figure 7:
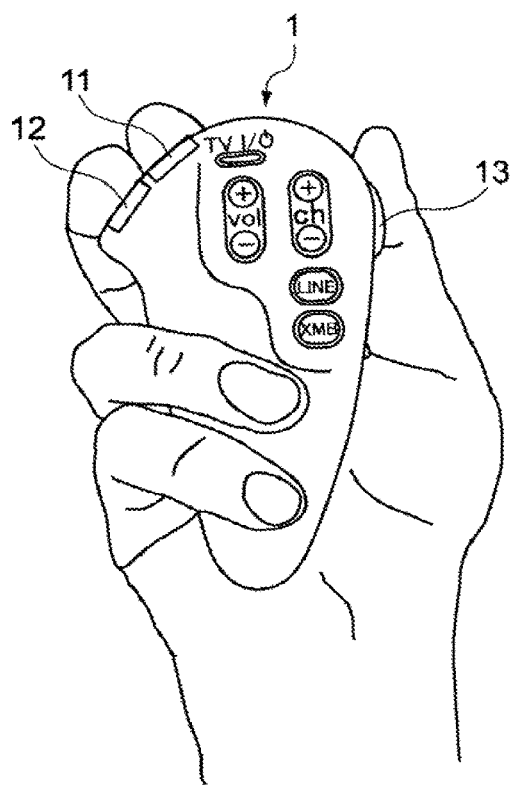
FIG. 7 is a diagram showing a state where a user is holding the input apparatus.

FIG. 7 is a diagram showing a state where the user is holding the input apparatus 1. As shown in FIG. 7, the input apparatus 1 may include, in addition to the buttons 11, 12, and 13, operation sections including various operation buttons such as those provided to a remote controller for operating a television or the like and a power switch, for example. When the user moves the input apparatus 1 in the air or operates the operation section while holding the input apparatus 1 as shown in the figure, input information is output to the control apparatus 40, and the UI is controlled by the control apparatus 40.

Next, a description will be given on typical examples of ways of moving the input apparatus 1 and ways the pointer 2 moves on the screen 3 thereby. FIG. 8 are explanatory diagrams therefor.

Figure 8A:
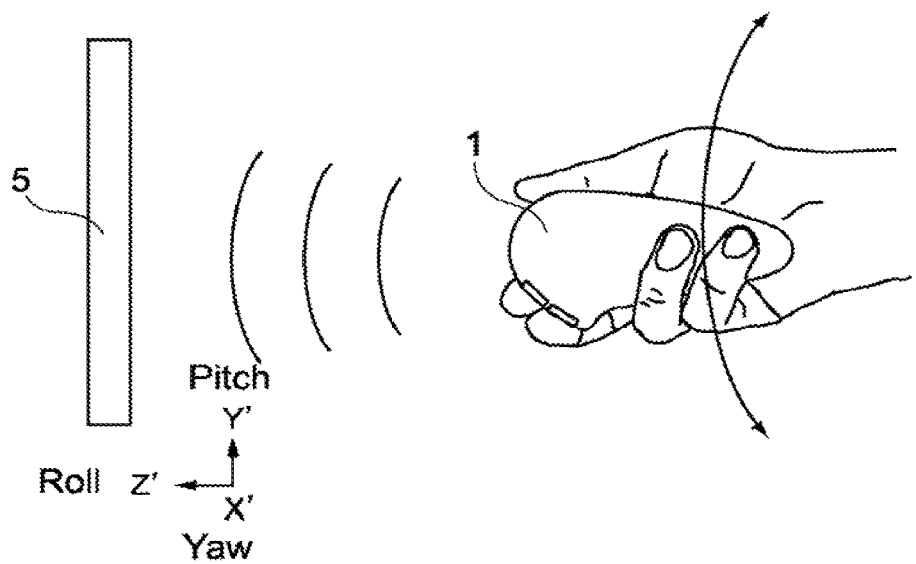
FIGS. 8A and 8B are explanatory diagrams showing typical examples of ways of moving the input apparatus and ways a pointer moves on a screen thereby.
Figure 8B:
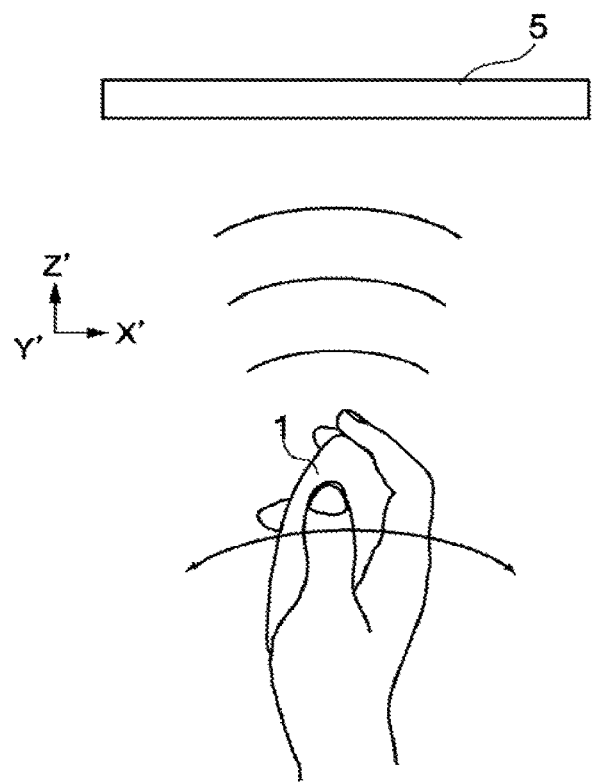

As shown in FIGS. 8A and 8B, the user holds the input apparatus 1 so as to aim the buttons 11 and 12 side of the input apparatus 1 at the display apparatus 5 side. The user holds the input apparatus 1 so that a thumb is located on an upper side and a pinky is located on a lower side as in handshakes. In this condition, the circuit board 25 (see FIG. 4) of the sensor unit 17 is substantially in parallel with the screen 3 of the display apparatus 5, and the two axes as the detection axes of the sensor unit 17 respectively correspond to the horizontal axis (X axis) and the vertical axis (Y axis) on the screen 3. Hereinafter, the position of the input apparatus 1 as shown in FIGS. 8A and 8B is referred to as reference position.

As shown in FIG. 8A, when the user swings a wrist or an arm in the vertical direction, that is, the pitch direction while the input apparatus 1 is in the reference position, the second acceleration sensor 162 detects an acceleration in the Y'-axis direction and the first angular velocity sensor 151 detects an angular velocity about the X' axis (see FIG. 4). Based on those detection values, the control apparatus 40 controls the display of the pointer 2 such that the pointer 2 moves in the Y-axis direction in FIG. 6.

Meanwhile, as shown in FIG. 8B, when the user swings the wrist or the arm in the horizontal direction, that is, the yaw direction while the input apparatus 1 is in the reference position, the first acceleration sensor 161 detects an acceleration in the X'-axis direction and the second angular velocity sensor 152 detects an angular velocity about the Y' axis (see FIG. 4). Based on those detection values, the control apparatus 40 controls the display of the pointer 2 such that the pointer 2 moves in the X-axis direction shown in FIG. 6.

Although descriptions will be given later, in the embodiment, the MPU 50 of the input apparatus 1 calculates, in accordance with the program stored in a built-in nonvolatile memory, the velocity values in the yaw and pitch directions based on the detection values detected by the sensor unit 17. In this case, mainly the MPU 50 of the input apparatus 1 calculates velocity information. Here, a dimension of an integration value (velocity) of the acceleration values of two axes detected by the acceleration sensor unit 16 is used in principal for the control of the movement of the pointer 2. Then, input information on the velocity dimension is transmitted to the control apparatus 40.

In another embodiment, the input apparatus 1 transmits the physical amounts detected by the angular velocity sensor unit 15 and the like to the control apparatus 40 as input information. In this case, the MPU 35 of the control apparatus 40 calculates the velocity values in the yaw and pitch directions based on the received input information in accordance with a program stored in the ROM 37 and controls display such that the pointer 2 moves according to the velocity values (see FIG. 14).

The control apparatus 40 converts a displacement in the yaw direction per unit time into a displacement amount of the pointer 2 on the X axis on the screen 3, and converts a displacement in the pitch direction per unit time into a displacement amount of the pointer 2 on the Y axis on the screen 3, to thereby move the pointer 2. Typically, regarding the velocity values supplied every predetermined number of clocks, the MPU 35 of the control apparatus 40 adds an n-th velocity value that has been supplied to an (n−1)-th velocity value that has been supplied. Accordingly, the n-th velocity value that has been supplied corresponds to the displacement amount of the pointer 2, and coordinate information of the pointer 2 on the screen 3 is generated. In this case, mainly the MPU 35 of the control apparatus 40 calculates the coordinate information.

A calculation method regarding an integral of the acceleration values that is used when calculating the velocity values only needs to be the same as that for the displacement amounts.

Next, a description will be given on a gravitational effect with respect to the acceleration sensor unit 16. FIG. 9 and FIG. 10 are explanatory diagrams therefor. FIG. 9 are diagrams showing the input apparatus 1 seen from the Z' direction. FIG. 10 are diagrams showing the input apparatus 1 seen from the X' direction.

In FIG. 9A, the input apparatus 1 is in the reference position and is held still. At this time, an output of the first acceleration sensor 161 is substantially zero, and an output of the second acceleration sensor 162 is an output corresponding to a gravity acceleration G. However, as shown in FIG. 9B, for example, in a condition where the input apparatus 1 is tilted in the yaw direction, the first and second acceleration sensors 161 and 162 respectively detect acceleration values of tilt components of the gravity acceleration G.

In this case, the first acceleration sensor 161 detects the acceleration in the X'-axis direction even when the input apparatus 1 is not actually moved in the yaw direction in particular. The condition shown in FIG. 9B is equivalent to a condition where, when the input apparatus 1 is in the reference position as shown in FIG. 9C, the acceleration sensor unit 16 has received inertial forces Ix and Iy as respectively indicated by arrows with broken lines, thus being undistinguishable by the acceleration sensor unit 16. As a result, the acceleration sensor unit 16 judges that an acceleration in a lower left-hand direction is applied to the input apparatus 1, and outputs a detection signal different from the actual movement of the input apparatus 1. In addition, because the gravity acceleration G constantly acts on the acceleration sensor unit 16, an integration value is increased and an amount by which the pointer 2 is displaced in the downward oblique direction is increased at an accelerating pace. When the condition is shifted from that shown in FIG. 9A to that shown in FIG. 9B, it is considered that inhibition of the movement of the pointer 2 on the screen 3 is an operation that intrinsically matches the intuitional operation of the user.

Figure 10A:
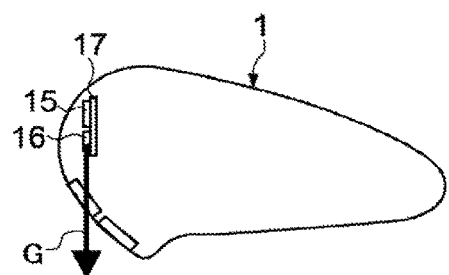
FIGS. 10A, 10B, and 10C are diagrams showing the input apparatus seen from an X' direction.
Figure 10B:
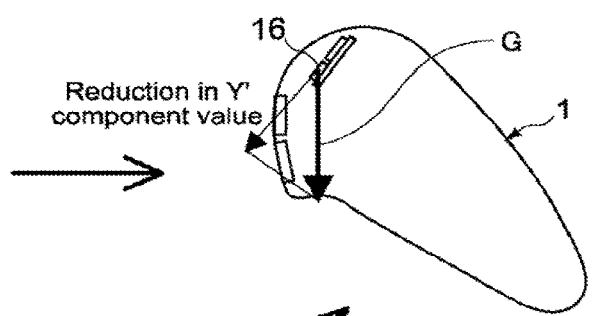
Figure 10C:
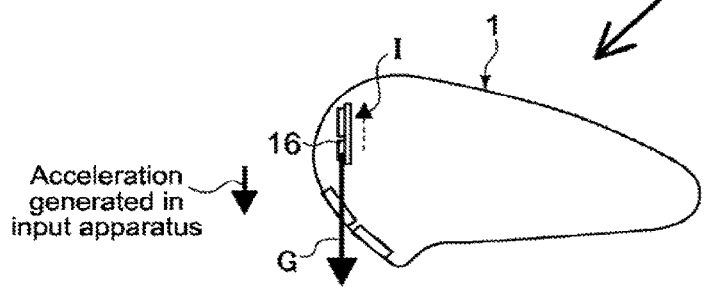

The same holds true also when the input apparatus 1 is rolled in the pitch direction from the reference position of the input apparatus 1 as shown in FIG. 10A to tilt as shown in FIG. 10B, for example. In such a case, because the gravity acceleration G detected by the second acceleration sensor 162 at the time the input apparatus 1 is in the reference position decreases, it is difficult for the input apparatus 1 to make a distinguishment from the inertial force I in the pitch direction as shown in FIG. 10C.

Figure 11:
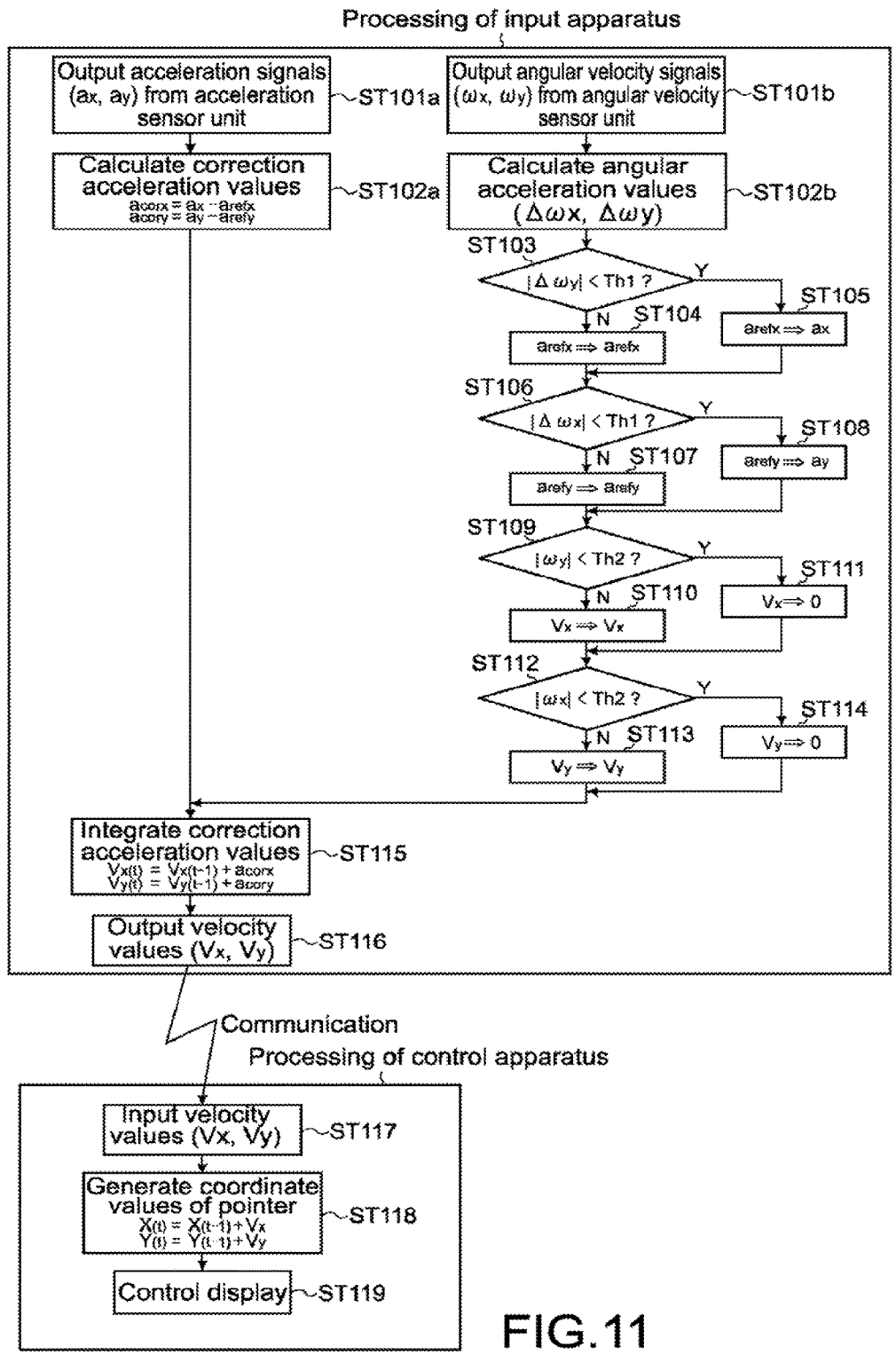
FIG. 11 is a flowchart showing an operation of calculating velocity values of the input apparatus 1.

To reduce such a gravitational effect with respect to the acceleration sensor unit 16 as much as possible, the input apparatus 1 of this embodiment uses the angular velocity values detected by the angular velocity sensor unit 15 to calculate the velocity values of the input apparatus 1. Descriptions on an operation thereof will be given below. FIG. 11 is a flowchart showing the operation.

Power of the input apparatus 1 is turned on. For example, the user turns on a power switch or the like provided to the input apparatus 1 or the control apparatus 40 to turn on the power of the input apparatus 1. When the power is turned on, biaxial acceleration signals (first and second acceleration values $a_x$ and $a_y$) are output from the acceleration sensor unit 16 (Step 101$a$) and supplied to the MPU 50. The acceleration signals are signals corresponding to the position of the input apparatus 1 at a point when the power is turned on (hereinafter, referred to as initial position).

There are cases where the initial position is the reference position. However, a position at which the entire amount of the gravity acceleration in the X'-axis direction is detected, that is, a position at which the output of the first acceleration sensor 161 is the acceleration value corresponding to the amount of the gravity acceleration and the output of the second acceleration sensor 162 is zero is also possible. As a matter of course, the initial position may be a position tilted as shown in FIG. 9B.

The MPU 50 of the input apparatus 1 acquires the acceleration signals ($a_x$, $a_y$) from the acceleration sensor unit 16 every predetermined number of clocks. Upon acquiring the second and subsequent acceleration signals ($a_x$, $a_y$), the MPU 50 performs the following operation to remove the gravitational effect. Specifically, as in Equations (1) and (2) below, the MPU 50 subtracts gravity acceleration components (first $a_x$ (=$a_{refx}$) and $a_y$ (=$a_{refy}$)) in the X'- and Y'-axis directions detected last time from the currently-obtained acceleration values $a_x$ and $a_y$, respectively, to thereby generate a first correction acceleration value $a_{corx}$ and a second correction acceleration value $a_{cory}$ (Step 102$a$).

$$a_{corx} = a_x - a_{refx} \tag{1}$$

$$a_{cory} = a_y - a_{refy} \tag{2}$$

Hereinafter, $a_{refx}$ and $a_{refy}$ will be referred to as reference acceleration value on the X' axis and reference acceleration value on the Y' axis (first reference acceleration value and second reference acceleration value), respectively. $a_{refx}$ and $a_{refy}$ used in the first calculation of Step 102$a$ since turning on of the power are acceleration signals $a_x$ and $a_y$ detected right after the turning on of the power.

As shown in Equations (3) and (4), the MPU 50 calculates a first velocity value $V_x$ and a second velocity value $V_y$ by respectively adding the first and second correction acceleration values $a_{corx}$ and $a_{cory}$ that is, by an integration operation (Step 115).

$$V_x(t) = V_x(t-1) + a_{corx} \tag{3}$$

$$V_y(t) = V_y(t-1) + a_{cory} \tag{4}$$

$V_x(t)$ and $V_y(t)$ represent the currently-obtained velocity values and $V_x(t-1)$ and $V_y(t-1)$ represent the velocity values obtained last time.

Meanwhile, when the power of the input apparatus 1 is turned on as described above, biaxial angular velocity signals (first and second angular velocity values $\omega_x$ and $\omega_y$) are output from the angular velocity sensor unit 15 (Step 101$b$) and supplied to the MPU 50. Upon acquisition, the MPU 50 respectively calculates angular acceleration values (first angular acceleration value $\Delta\omega_x$ and second angular acceleration value $\Delta\omega_y$) by a derivation operation (Step 102$b$).

The MPU 50 judges whether absolute values $|\Delta\omega_x|$ and $|\Delta\omega_y|$ of $\Delta\omega_x$ and $\Delta\omega_y$ above, respectively, are smaller than a threshold value Th1 (Step 103, Step 106). When $|\Delta\omega_y| \geq Th1$, the MPU 50 uses the first reference acceleration value $a_{refx}$ as it is and does not update it (Step 104). Similarly, when $|\Delta\omega_x| \geq Th1$, the MPU 50 uses the second reference acceleration value $a_{refy}$ as it is and does not update it (Step 107).

A value close to zero is set as the threshold value Th1. The threshold value Th1 takes into account the angular velocity values that are detected due to a hand movement of the user, a DC offset, or the like even when the user is consciously holding the input apparatus 1 still. Thus, the pointer 2 is prevented from being moved during display due to the hand movement or the DC offset in the case where the user is consciously holding the input apparatus 1 still.

Reasons for performing the processing as described above are as follows.

Figure 12:
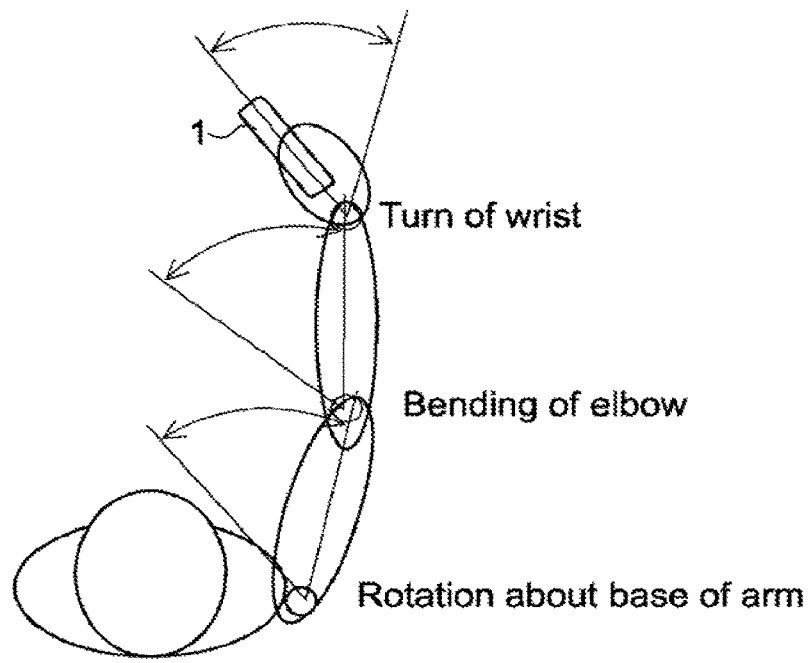
FIG. 12 is a top view of the user operating the input apparatus.

FIG. 12 is a top view of the user operating the input apparatus 1. When the user operates the input apparatus 1 naturally, the operation is made by at least one of a rotation from a base of an arm, bending of an elbow, and a turn of a wrist. Therefore, generation of the acceleration leads to generation of the angular acceleration. Specifically, the acceleration is assumed to be subservient to the angular acceleration generated in the same direction as the acceleration. Therefore, by the MPU 50 monitoring the second angular acceleration value $|\Delta\omega_y|$, it is possible to judge whether or not to update the first reference acceleration value $a_{refx}$ in the same direction, and judge whether or not to eventually correct the first correction acceleration value $a_{corx}$ from Equation (1). The same holds true for the first angular acceleration value $|\Delta\omega_x|$.

More specifically, when the second angular acceleration value $|\Delta\omega_y|$ is equal to or larger than the threshold value Th1, the MPU 50 judges that the input apparatus 1 is moving in the yaw direction. In this case, the MPU 50 does not update the first reference acceleration value $a_{refx}$. As a result, the first correction acceleration value $a_{corx}$ is not corrected and the integration operation of Equation (3) is continued based on $a_{corx}$.

Further, when the first angular acceleration value $|\Delta\omega_x|$ is equal to or larger than the threshold value Th1, the MPU 50 judges that the input apparatus 1 is moving in the pitch direction. In this case, the MPU 50 does not update the second reference acceleration value $a_{refy}$. As a result, the second correction acceleration value $a_{cory}$ is not corrected and the integration operation of Equation (4) is continued based on $a_{cory}$.

Meanwhile, when the second angular acceleration value $|\Delta\omega_y|$ is smaller than the threshold value Th1 in Step 103, the MPU 50 judges that the input apparatus 1 is not moved in the yaw direction. In this case, the MPU 50 updates the first reference acceleration value $a_{refx}$ to the currently-obtained (latest) detection value $a_x$, to thereby correct the first correction acceleration value $a_{corx}$, using Equation (1) (Step 105). The latest detection value $a_x$ is a detection value obtained while the input apparatus 1 is held almost still, thus being a component value by the gravity acceleration.

Similarly, when the first angular acceleration value $|\Delta\omega_x|$ is smaller than the threshold value Th1 in Step 106, the MPU 50 judges that the input apparatus 1 is not moved in the pitch direction. In this case, the MPU 50 updates the second reference acceleration value $a_{refy}$ to the currently-obtained (latest) detection value $a_y$, to thereby correct the second correction acceleration value $a_{cory}$ using Equation (2) (Step 108).

In this embodiment, the threshold values in both the yaw direction and the pitch direction have been set to the same value Th1. However, different threshold values may be used for both directions.

In the above description, the angular acceleration values $\Delta\omega_x$ and $\Delta\omega_y$ have been monitored, but the MPU 50 can also monitor the angular velocity values $\omega_x$ and $\omega_y$ to correct the velocity values calculated in Equations (3) and (4). Based on the same idea as that of FIG. 12, assuming that generation of the velocity leads to generation of the angular velocity, it can be assumed that the velocity is subservient to the angular velocity in the same direction as the direction of the velocity.

Specifically, when the absolute value of the second angular velocity value $|\omega_y|$ is equal to or larger than a threshold value Th2 (NO in Step 109), the MPU 50 judges that the input apparatus 1 is moving in the yaw direction. In this case, the MPU 50 does not correct the first velocity value $V_x$ (Step 110). The same holds true for the absolute value of the first angular velocity value $|\omega_x|$ (NO in Step 112, and Step 113).

The threshold value Th2 also only needs to be set in the same manner as the threshold value Th1.

On the other hand, when the absolute value of the second angular velocity value $|\omega_y|$ is smaller than the threshold value Th2 (YES in Step 109), the MPU 50 judges that the input apparatus 1 is not moved in the yaw direction. In this case, the MPU 50 corrects the first velocity value $V_x$ to, for example, zero to reset the value (Step 111). The same holds true for the absolute value of the first angular velocity value $|\omega_x|$ (YES in Step 112, and Step 114).

As described above, the MPU 50 outputs the velocity values $V_x$ and $V_y$ in both directions to the MPU 60, and the MPU 60 outputs the velocity values $V_x$ and $V_y$ to the control apparatus 40 via the transceiver 21 (Step 116).

Figure 14:
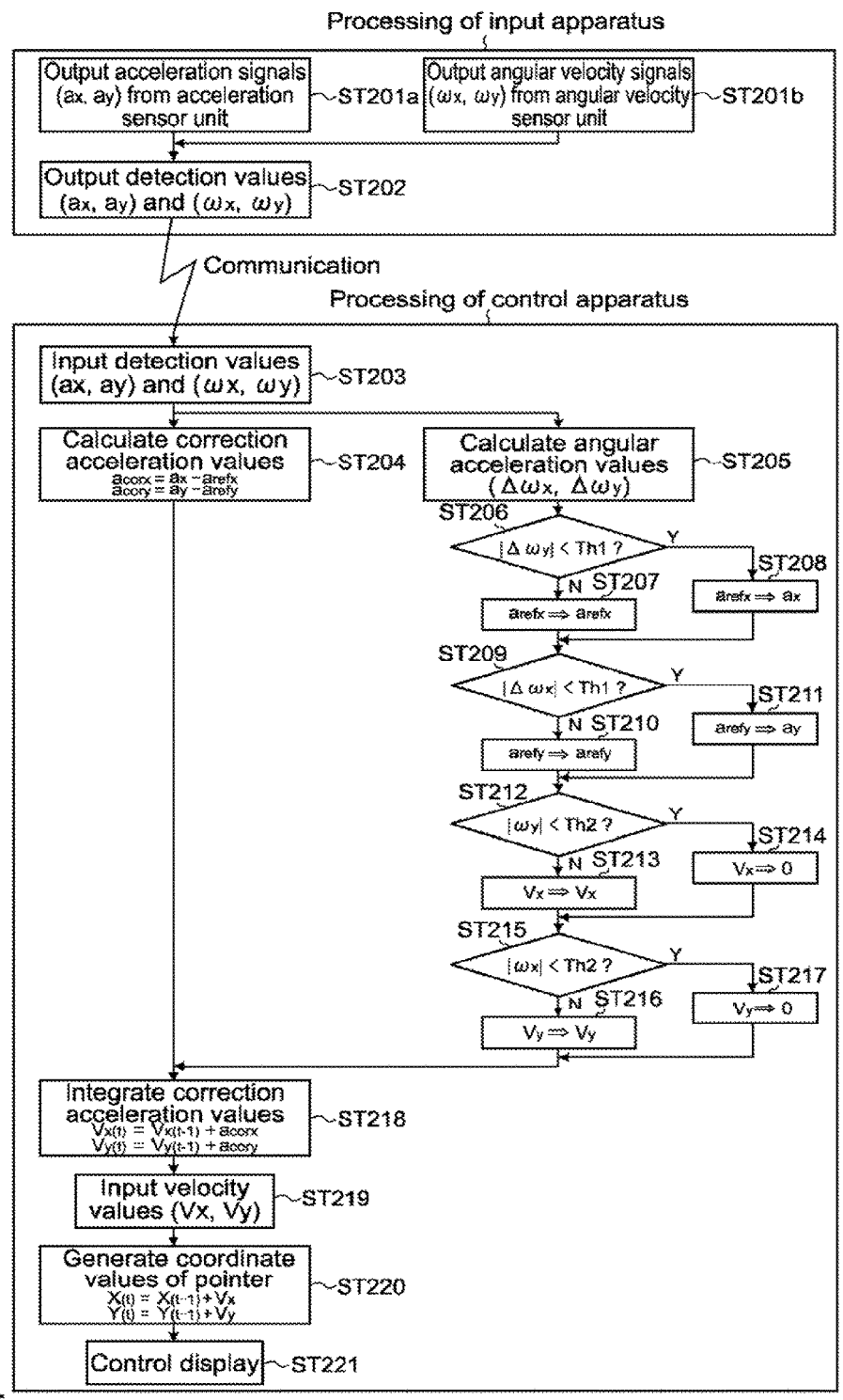
FIG. 14 is a flowchart showing another embodiment described above.

The MPU 50 typically executes Steps 101a and 101b synchronously, but Step 101b may be executed after executing Step 101a, or Step 101a may be executed after executing Step 101b. Moreover, the order of the processes of Steps 103, 105, 109, and 112 is not limited to the example above. In other words, the order of processes of those steps can arbitrarily be changed. The same holds true also for processing shown in FIG. 14. Further, when the embodiment is applied to an electronic apparatus (handheld display apparatus) in which the input apparatus and the control apparatus are integrated, the processing shown in FIGS. 11 and 14 is executed in the same apparatus.

The MPU 35 of the control apparatus 40 is input with the velocity values $V_x$ and $V_y$ as input information (Step 117). The MPU 35 generates coordinate values X and Y of the pointer 2 corresponding to the velocity values $V_x$ and $V_y$, that are shown in Equations (5) and (6) below (Step 118), and controls display such that the pointer 2 moves on the screen 3 (Step 119).

$$X(t)=X(t-1)+V_x \quad (5)$$

$$Y(t)=Y(t-1)+V_y \quad (6)$$

As described above, the reference acceleration values $a_{refx}$ and $a_{refy}$ are updated and the correction acceleration values $a_{corx}$ and $a_{cory}$ are corrected when the input apparatus 1 is held almost still, with the result that the gravitational effect with respect to the acceleration sensor unit 16 can be suppressed. In addition, because the correction acceleration values $a_{corx}$ and $a_{cory}$ are corrected using Equations (1) and (2) upon update of the reference acceleration values $a_{refx}$ and $a_{refy}$, a DC level is also corrected, thereby solving the problem regarding the DC offset. Further, because the velocity values are corrected so as to be reset to zero when the input apparatus 1 is held almost still, integration errors can also be suppressed. When an integration error is generated, a phenomenon in which the pointer 2 moves on the screen 3 irrespective of the fact that the user has stopped moving the input apparatus 1 occurs.

Figure 13:
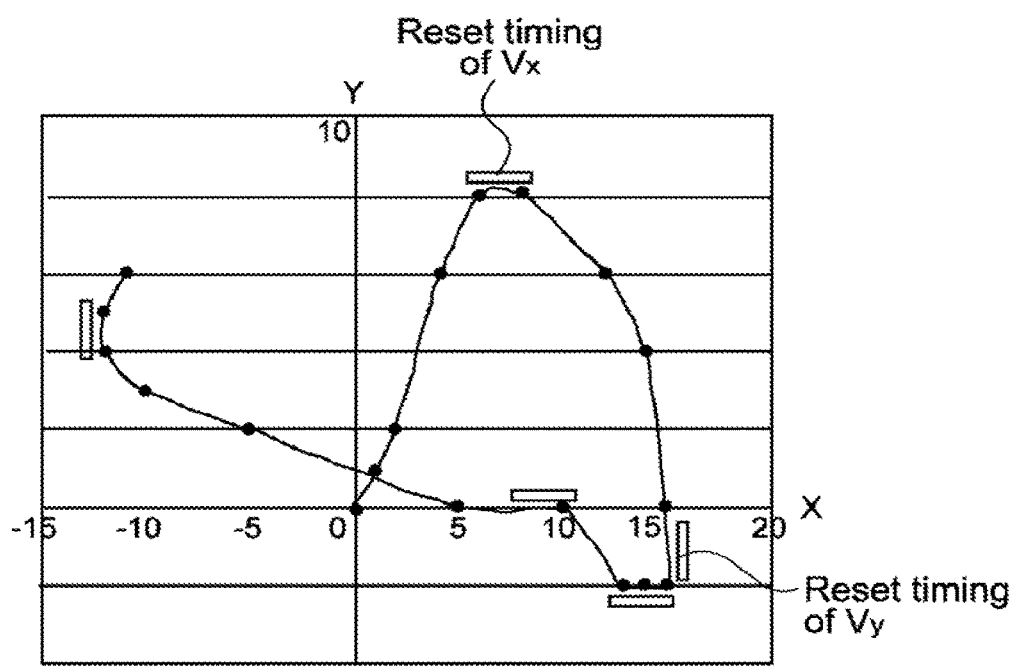
FIG. 13 is a diagram showing a trajectory of the input apparatus 1 seen from a plane formed by an X axis and a Y axis.

Moreover, in this embodiment, because the first reference acceleration value $a_{refx}$ and the second reference acceleration value $a_{refy}$ are updated individually, when even one of the angular acceleration values in the yaw direction and the pitch direction becomes smaller than the threshold value, a correction thereof is performed. Therefore, it is possible to update the first reference acceleration value $a_{refx}$ or the second reference acceleration value $a_{refy}$ with a time interval short enough for practical use. The same holds true for the individual corrections of the first velocity value $V_x$ and the second velocity value $V_y$. FIG. 13 is an explanatory diagram to help understand the above description.

FIG. 13 shows a trajectory of the input apparatus 1 seen from a plane formed by the X axis and the Y axis. $V_x$ is reset to zero if the angular velocity value $\omega_y$ in the yaw direction is substantially zero (smaller than the threshold value Th2). $V_y$ is reset to 0 if the angular velocity value $\omega_x$ in the pitch direction is substantially 0 (smaller than the threshold value Th2).

In the related art, for suppressing the gravitational effect, in addition to the input apparatus 1 provided with six sensors, there is also an apparatus that detects a gravity vector change per unit time by a triaxial acceleration sensor to thus recognize the angular velocities in the roll direction and the pitch direction, and sets them as XY displacement amounts. Although there is no problem concerning the Y-axis direction, because this apparatus is of a type that moves the pointer 2 in the X-axis direction based only on the twist or turn of a wrist of the user in the roll direction, the intuitional operation of the user is not matched.

FIG. 14 is a flowchart showing another embodiment described above. In this flowchart, the input apparatus 1 outputs as input information the biaxial acceleration signals and biaxial angular velocity signals output from the sensor unit 17 to the control apparatus 40. The MPU 35 of the control apparatus 40 executes Steps 102a and 102b to 115 shown in FIG. 11 in Steps 204 to 218. Details thereof are the same as those of FIG. 11, so descriptions thereof will be omitted.

The input apparatus 1 may be, for example, a remote controller used for remotely controlling a television or the like, or an input apparatus for a game machine.

Next, descriptions will be given on a switch between operation modes of the input apparatus 1.

Figure 15:
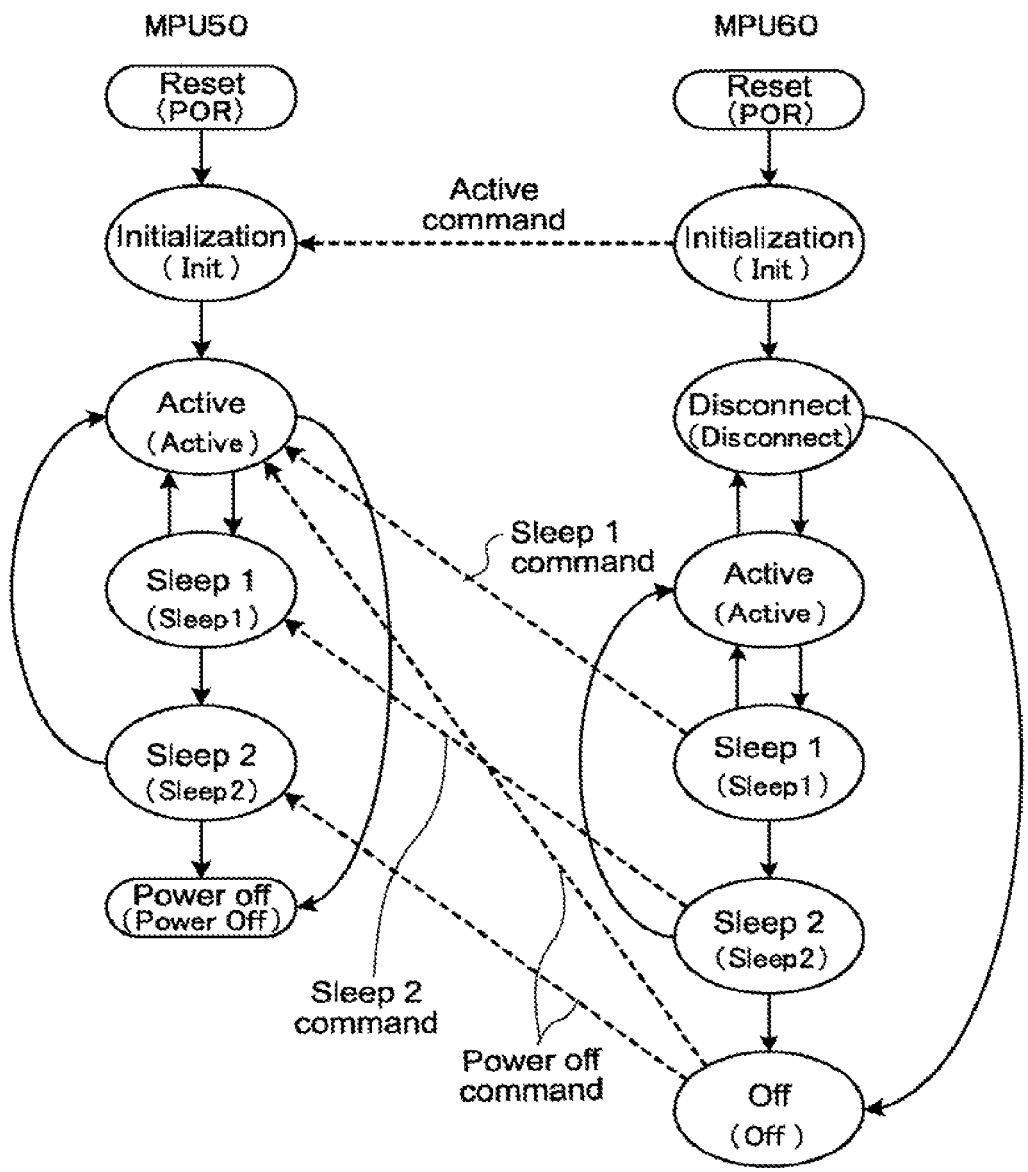
FIG. 15 is a diagram showing transitional relations of operation modes of MPUs 50 and 60 of the input apparatus.

FIG. 15 is a diagram showing transitional relations of operation modes of the MPUs 50 and 60 of the input apparatus 1.

As shown in the figure, the MPUs 50 and 60 are each set to make transitions among a plurality of operation modes. Arrows with dotted lines in FIG. 15 indicate commands transmitted from the MPU 60 to the MPU 50. The operation mode transitions of the MPU 50 are caused by those commands indicated by the arrows with dotted lines. Operations of the MPUs 50 and 60 are set according to respective operation modes.

The MPU 50 makes transitions among the operation modes of a reset mode (POR: Power On Reset), an initialization mode (Init), an active mode (Active) (normal mode), a sleep 1 mode (Sleep 1) (first power-saving mode), a sleep 2 mode (Sleep 2) (second power-saving mode), and a power off mode (Power Off) (third power-saving mode).

The MPU 60 makes transitions among the operation modes of a reset mode (POR), an initialization mode (Init), a disconnect mode (Disconnect), an active mode (Active) (normal mode), a sleep 1 mode (Sleep 1) (first power-saving mode), a sleep 2 mode (Sleep 2) (second power-saving mode), and an off mode (Off) (third power-saving mode).

The reset mode (POR) is a condition immediately after the power of the input apparatus 1 is turned on. After that, the MPUs 50 and 60 each shift to device initialization processing.

The initialization mode (Init) is, in each of the MPUs 50 and 60, a condition where hardware initialization has been completed. The MPU 50 is in a standby condition until receiving an active command indicated by an arrow with a dotted line from the MPU 60. The active command is a command to cause the MPU 50 to make a transition from the initialization mode (Init) to the active mode (Active). Immediately after the completion of its hardware initialization, the MPU 60 transmits the active command to the MPU 50 and makes a transition to the disconnect mode (Disconnect).

The disconnect mode (Disconnect) is a condition peculiar to the MPU 60 and a condition where radio communication with the control apparatus 40 being a personal computer is disabled. The MPU 60 determines a frequency of radio waves for radio communication with a radio communication device on the control apparatus 40 side and acquires an identification code from the radio communication device. Thus, radio communication between the input apparatus 1 and the control apparatus 40 is enabled. At a stage where the radio communication is enabled, the MPU 60 makes a transition to the active mode (Active). When the radio communication is not enabled for a certain period of time (for example, five minutes), the MPU 60 makes a transition to the off mode (Off).

The active mode (Active) is, in each of the MPUs 50 and 60, a normal operating condition. For example, the MPU 50 reads the detection signals of the angular velocities and accelerations detected by the angular velocity sensor unit 15 and the acceleration sensor unit 16 and calculates the velocity values $V_x$ and $V_y$ of the cursor (pointer) 2 shown in FIG. 6 in the X direction (horizontal direction) and the Y direction (vertical direction). Further, the MPU 50 detects on/off conditions of the buttons 11, 12, 13, and the like.

The MPU 60 periodically acquires the velocity values $V_x$ and $V_y$ and the on/off conditions of the buttons 11, 12, 13, and the like from the MPU 50 by a command (for example, cycle of 10 msec). The MPU 60 transmits the information received from the MPU 50 to the control apparatus 40 via the transceiver 21 by radio communication. When the ratio communication between the control apparatus 40 and the input apparatus 1 is disabled at this time, the MPU 60 makes a transition from the active mode (Active) to the disconnect mode (Disconnect) and enters the disconnect mode (Disconnect). When the radio communication is being continued, the MPU 60 judges a condition where the velocity values $V_x$ and $V_y$ are both zero and the buttons 11, 12, 13, and the like are all in the Off condition as "a condition where the user is not operating the input apparatus 1", and when this condition continues for a first predetermined time (for example, 30 seconds), makes a transition to the sleep 1 mode (Sleep 1).

The sleep 1 mode (Sleep 1) is, in each of the MPUs 50 and 60, a condition in a first-stage power-saving mode. Immediately after making the transition to the sleep 1 mode (Sleep 1), the MPU 60 transmits a sleep 1 command also to the MPU 50 to cause a transition to the sleep 1 mode (Sleep 1). After transmitting the sleep 1 command, the MPU 60 sets the MPU 60 itself to the power-saving mode.

Upon receiving the sleep 1 command, the MPU 50 makes a transition to the sleep 1 mode (Sleep 1), turns off the switch 51 to turn off power of the angular velocity sensor unit 15, sets the acceleration sensor unit 16 to transmit an interrupt signal to the MPU 50 by detection of the movement of the input apparatus 1, and thereafter sets the MPU 50 itself to the power-saving mode.

When the detection values of the first acceleration sensor 161 and the second acceleration sensor 162 of the acceleration sensor unit 16 are zero and the buttons 11, 12, and 13 are all in the off condition even after a second predetermined time (for example, one minute) has elapsed since having become stationary, the MPU 60 makes a transition to the sleep 2 mode (Sleep 2).

The sleep 2 mode (Sleep 2) is, in each of the MPUs 50 and 60, a condition in a second-stage power-saving mode. Immediately after making the transition to the sleep 2 mode (Sleep 2), the MPU 60 transmits a sleep 2 command also to the MPU 50 to cause a transition to the sleep 2 mode (Sleep 2). After transmitting the sleep 2 command, the MPU 60 sets itself to the power-saving mode.

Upon receiving the sleep 2 command, the MPU 50 makes a transition to the sleep 2 mode (Sleep 2), turns off the switch 52 to turn off power of the acceleration sensor unit 16 (to turn off power of both the acceleration sensor unit 15 and the angular velocity sensor unit 16), and sets the MPU 50 itself to the power-saving mode.

The off mode (Off) is a condition peculiar to the MPU 60 and a condition to stand by until the MPU 50 turns off the power supply to the entire system. Upon making a transition to the off mode (Off), the MPU 60 transmits a power off command (Power Off command) to the MPU 50 to set the power off mode (Power Off). After that, the MPU 60 enters the standby condition until the power supply to the entire system is turned off.

Upon receiving the power off command (Power Off command), the MPU 50 executes necessary processing including parameter storage and the like, and thereafter sets the shutdown switch 48 of the DC-DC converter 26 to low and cuts off the power supplied to the entire input apparatus 1.

Figure 16:
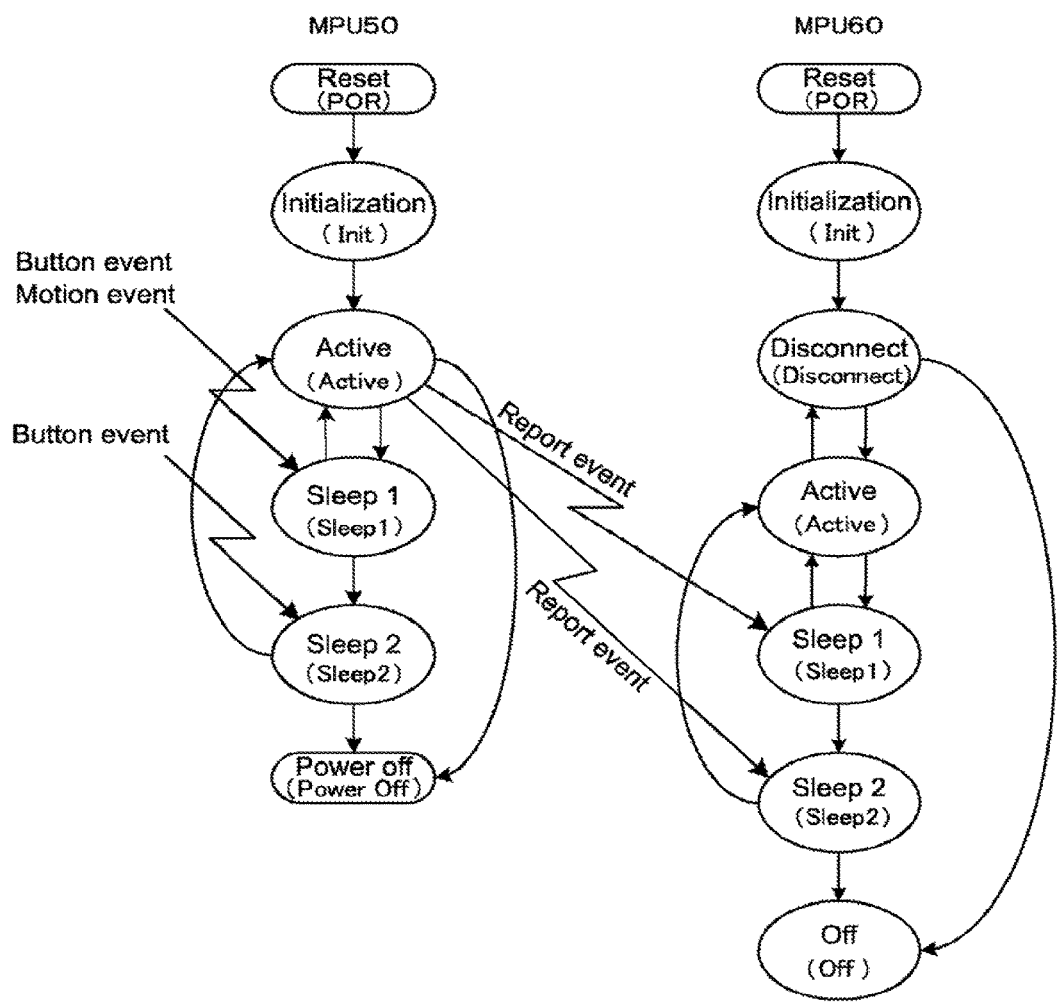
FIG. 16 is a diagram showing mode transitions of the MPU 60 based on events which have occurred in the MPU 50.

FIG. 16 is a diagram showing mode transitions of the MPU 60 based on events which have occurred in the MPU 50.

Zigzag arrows of FIG. 16 indicate events. A button event (Button Event) is an event input from the buttons 11, 12, 13, and the like to the MPU 50 when the buttons 11, 12, 13, and the like are operated by the user. A motion event (Motion Event) is an event input from the acceleration sensor unit 16 to the MPU 50 when an acceleration is given to the input apparatus 1 by the user.

A report event (Report Event) is a notice event from the MPU 50 to the MPU 60. The report event (Report Event) is an event caused by a specific signal input from the MPU 50 to the MPU 60 when the button event (Button Event) or the motion event (Motion Event) occurs in the MPU 50.

The MPU 50 causes the MPU 60 in the sleep 1 mode (Sleep 1) or the sleep 2 mode (Sleep) to make a transition to the active mode (Active) by the report invent (Report Event).

FIG. 17 is a diagram showing transition conditions of the operation modes of the MPU 50.

In FIG. 17, the operation modes as transition sources of the MPU 50 are shown in a column direction, and the operation modes as transition destinations of the MPU 50 are shown in a row direction.

When receiving the active command (Active command) from the MPU 60 in the initialization mode (Init), the MPU 50 makes a transition to the active mode (Active).

When receiving the sleep 1 command (Sleep 1 command) from the MPU 60 in the active mode (Active), the MPU 50 makes a transition to the sleep 1 mode (Sleep 1). When receiving the power off command (Power Off command) from the MPU 60 in the active mode (Active), the MPU 50 makes a transition to the power off mode (Power Off).

When receiving the button event (Button Event) or the motion event (Motion event) caused by the user in the sleep 1 mode (Sleep 1), the MPU 50 makes a transition to the active mode (Active).

When receiving the sleep 2 command (Sleep 2 command) from the MPU 60 in the sleep 1 mode (Sleep 1), the MPU 50 makes a transition to the sleep 2 mode (Sleep 2). When receiving the power off command (Power Off command) from the MPU 60 in the sleep 1 mode (Sleep 1), the MPU 50 may make a transition to the power off mode (Power Off).

When receiving the button event (Button Event) caused by the user in the sleep 2 mode (Sleep 2), the MPU 50 makes a transition to the active mode (Active).

When receiving the power off command (Power Off command) from the MPU 60 in the sleep 2 mode (Sleep 2), the MPU 50 makes a transition to the power off mode (Power Off).

FIG. 18 is a diagram showing transition conditions of the operation modes of the MPU 60.

Similar to FIG. 17, in FIG. 18, the operation modes as transition sources of the MPU 60 are shown in the column direction, and the operation modes as transition destinations of the MPU 60 are shown in the row direction.

In the initialization mode (Init), the MPU 60 outputs the active command (Active command) for initializing the MPU 50 to the MPU 50 to initialize the MPU 50, and makes a transition to the disconnect mode (Disconnect).

When succeeding in a connection of radio communication with the control apparatus 40 side in the disconnect mode (Disconnect), the MPU 60 makes a transition to the active mode (Active).

When the connection of the radio communication with the control apparatus 40 side is disabled in the active mode (Active), the MPU 60 makes a transition to the disconnect mode (Disconnect).

When the connection of the radio communication with the control apparatus 40 side has been disabled for a predetermined time (for example, five minutes), the MPU 60 makes a transition to the off mode (Off).

When the report event (Report Event) is not input for a predetermined time (for example, 30 seconds) since having become stationary in the active mode (Active), the MPU 60 makes a transition to the sleep 1 mode (Sleep 1).

When the report event (Report Event) is input from the MPU 50 in the sleep 1 mode (Sleep 1), the MPU 60 makes a transition to the active mode (Active).

When the report event (Report Event) is not input from the MPU 50 for a predetermined time (for example, one minute) since having become stationary in the sleep 1 mode (Sleep 1), the MPU 60 makes a transition to the sleep 2 mode (Sleep 2).

When the report event (Report Event) is input from the MPU 50 in the sleep 2 mode (Sleep 2), the MPU 60 makes a transition to the active mode (Active).

When the report event (Report Event) is not input from the MPU 50 for a third predetermined time (for example, five minutes) since having become stationary in the sleep 2 mode (Sleep 2), the MPU 60 makes the transition to the off mode (Off).

As described above, according to this embodiment, the input apparatus 1 includes the MPU 50 and the MPU 60, and the MPU 50 can obtain the velocity values based on the detection signals from the angular velocity sensor unit 15 and the like and transmit the velocity values to the MPU 60 together with the signals from the button 11 and the like. The MPU 60 can judge whether or not the input apparatus 1 is being operated based on the signals from the MPU 50, judge the operation mode of the transition destination based on the time elapsed since having become stationary, and transmit a judgment result to the MPU 50. Based on the judgment result from the MPU 60, the MPU 50 sets the MPU 50, the angular velocity sensor unit 15, and the like to the active mode when the input apparatus 1 is being operated, and sets the MPU 50, the angular velocity sensor unit 15, and the like to the sleep 1 mode, the sleep 2 mode, and the like when the input apparatus 1 is not operated. For example, when the MPU 60 judges that the input apparatus 1 is not operated, the MPU 60 can transmit the sleep 1 command to the MPU 50. The MPU 50 makes a transition to the sleep 1 mode (Sleep 1) or the like in response to the sleep 1 command or the like from the MPU 60. Then, the MPU 50 can turn off the power of the angular velocity sensor unit 15 so that the angular velocity sensor unit 15 does not detect the angular velocity values of the input apparatus 1. As a result, electric power consumed by the angular velocity sensor unit 15 can be cut down, thereby enabling a reduction in power consumption of the input apparatus 1.

Specifically, in the normal mode, for example, the acceleration sensor unit 16 is a passive type sensor whose consumption current is about 0.2 mA to 1 mA at 3 V drive. On the other hand, the angular velocity sensor unit 15 includes a mechanically-vibrated vibrator (not shown) and is required to constantly vibrate the vibrator to generate Coriolis force. To use the angular velocity sensor as a sensor for detecting a trigger for restoration from the power-saving mode, a driving circuit thereof needs to be kept operating. The consumption current of the angular velocity sensor driven at 3 V is about 6 mA to 12 mA, which is larger than that of the acceleration sensor unit 16. In other words, by switching to the sleep 1 mode (Sleep 1), the consumption current can be reduced to about $1/30$ to $1/12$ compared to that in the active mode (Active). Moreover, when the power-supply voltage is 3.3 V, the consumption current of the acceleration sensor unit 16 is 0.3 mA, and the consumption current of the angular velocity sensor unit 15 is 7 mA, the consumption current can be reduced to ⅟₂₃ by switching to the sleep 1 mode (Sleep 1).

After transmitting the sleep 1 command, the MPU 60 sets the MPU 60 itself to the power-saving mode.

The power-saving mode of the MPU 60 at this time is, for example, a condition where the reception cycle of signals from the MPU 50 is longer than that in the normal mode. Accordingly, electric power consumed by the MPU 60 can be cut down.

Upon receiving the sleep 1 command, as described above, the MPU 50 turns off the power of the angular velocity sensor unit 15, sets the acceleration sensor unit 16 to transmit the interrupt signal to the MPU 50 by detection of the movement of the input apparatus 1, and thereafter sets the MPU 50 itself to the power-saving mode.

The power-saving mode of the MPU 50 at this time is, for example, a condition where the supply of electric power to circuits required for output processing of the angular velocity sensor unit 15 is stopped or the sampling cycle of outputs of the acceleration sensor unit 16 is lengthened. Accordingly, electric power consumed by the MPU 50 can be cut down.

Therefore, by receiving the acceleration values (interrupt signal) from the acceleration sensor unit 16 and receiving the signals from the button 11 and the like when the input apparatus 1 is operated again, the MPU 50 can be restored from the sleep 1 mode (Sleep 1) to the active mode (Active) based on the acceleration values and the signals from the button 11 and the like. In other words, when the input apparatus 1 is operated again, the MPU 50 can turn on the switch 51 to supply the power to the angular velocity sensor unit 15. At this time, the MPU 50 transmits the report event (Report Event) to the MPU 60. By this report event (Report Event), the MPU 50 can restore the MPU 60 in the sleep 1 mode (Sleep 1) to the active mode (Active).

The MPUs 50 and 60 of the input apparatus 1 are set to make a stepwise transition to the power-saving mode. The MPU 50 includes modes such as the sleep 1 mode (Sleep 1), the sleep 2 mode (Sleep 2), and the power off mode (Power Off), and the MPU 60 includes the sleep 1 (Sleep 1), the sleep 2 (Sleep 2), the off mode (Off), and the like. For example, in the sleep 2 mode (Sleep 2), the MPU 50 turns off the switch 51 and the switch 52 to stop driving of the acceleration sensor unit 16 in addition to the angular velocity sensor unit 15, and sets the MPU 50 itself to the power-saving mode. The power-saving mode of the MPU 50 at this time is, for example, a condition where the supply of electric power to circuits required for output processing of the angular velocity sensor unit 15 and the acceleration sensor unit 16 is stopped. Accordingly, it is possible to reduce power consumption of the angular velocity sensor unit 15 to zero and also cut down power consumption of the acceleration sensor unit 16 and the MPU 50, in the sleep 2 mode. The power-saving mode of the MPU 60 at this time is, for example, a condition where a standby current necessary to receive the report event (Report Event) from the MPU 50 is flowing in the MPU 60.

When the MPUs 50 and 60 are in the sleep 2 mode (Sleep 2), the angular velocity sensor unit 15 and the acceleration sensor unit 16 are powered off. Therefore, even if the user operates the input apparatus 1, no angular velocity and acceleration can be detected. However, the input apparatus 1 includes the buttons 11, 12, and 13, and the MPU 50 can detect on/off signals of the buttons 11, 12, and 13 (detection means). Based on the on/off signals of the button 11 and the like (when at least one button out of the buttons 11, 12, and 13 is operated), the MPU 50 turns on the switch 51 and the switch 52 so that restoration can be made from the sleep 2 mode (Sleep 2) to the active mode (Active). At this time, the MPU 50 can transmit the report event (Report Event) to the MPU 60. By this report event (Report Event), the MPU 50 can restore the MPU 60 in the sleep 2 mode (Sleep 2) to the active mode (Active).

The input apparatus 1 can transmit the velocity values and the on/off signals of the button 11 and the like to the control apparatus 40 via radio communication using the transceiver 21, and the control apparatus 40 can receive those on/off signals by the transceiver 38. Further, (the MPU 35 of) the control apparatus 40 can calculate the coordinate values of the pointer (cursor) 2 on the display screen based on the received velocity values $V_x$ and $V_y$. Therefore, the pointer (cursor) 2 can be displayed on the display screen while an operational load on the input apparatus 1 is reduced.

The input apparatus 1 includes the MPU 50, the MPU 60, and the DC-DC converter 26. The MPU 60 judges, based on setting information on radio communication transmitted/received between the input apparatus 1 and the control apparatus 40, whether the radio communication is enabled or not, and when the communication has been disabled for a predetermined time, outputs the power off command (Power Off command) to the MPU 50. The MPU 50 receives the power off command (Power Off command) and outputs a power supply off command for turning off the DC-DC converter 26 to the shutdown switch 48 of the DC-DC converter 26.

Thus, when the radio communication has been disabled for a predetermined time, the shutdown switch 48 of the DC-DC converter 26 is turned off, thereby achieving power saving of the input apparatus 1.

Moreover, an input operation of the user to the operation input section (first input operation section) can be used for restoration from the power off mode to the active mode. For example, a part or all of the buttons 11 to 13 can be structured as a mechanical switch (second input operation section) capable of forcibly performing an ON-operation of the shutdown switch 48. Consequently, even when the MPUs 50 and 60 are in the power off condition, the input apparatus 1 can be restored to the active mode. The input operation section may be a dedicated switch (second input operation section) different from the buttons 11 to 13.

The MPU 60 transmits the sleep 1 command (Sleep 1 command) to the MPU 50, and when the MPU 50 sets, for example, the MPU 50 itself to the sleep 1 mode (Sleep 1), requests the MPU 50 to acquire information on the set mode and confirms the operation mode of the MPU 50 using the acquired mode information. Accordingly, the MPU 60 can reliably judge that the MPU 50 has made a transition to a predetermined operation mode, whereby more accurate operation transition control can be made. It should be noted that the MPU 60 confirms the operation mode of the MPU 50 similarly in other operation mode transitions.

It is also possible to adopt a structure in which, in a case where each of the angular velocity sensor unit 15 and the acceleration sensor unit 16 can make a transition to the power-saving condition, when a predetermined time has elapsed since the input apparatus became stationary, the MPU 50 brings a sensor unit whose power consumption is lower into the power-saving condition and cuts off the supply of power to the other sensor unit based on power consumptions of the sensor units 15 and 16 in the power-saving conditions, for example. Specifically, when the power consumption of the angular velocity sensor unit 15 (first sensor) in the power-saving condition is higher than that of the acceleration sensor unit 16 (second sensor) in the power-saving condition, the MPU 50 brings the acceleration sensor unit 16 into the power-saving condition and cuts off the supply of power to the angular velocity sensor unit 15 in the same manner as in the above embodiments. In contrast, that is, when the power consumption of the angular velocity sensor unit 15 (first sensor) in the power-saving condition is lower than that of the acceleration sensor unit 16 (second sensor) in the power-saving condition, the MPU 50 brings the angular velocity sensor unit 15 into the power-saving condition and cuts off the supply of power to the acceleration sensor unit 16. In other words, settings can arbitrarily be made according to types, specifications, and the like of the sensors used.

Next, a specific example of operation mode transitions of the input apparatus 1 will be shown.

FIG. 19 is a diagram showing Example 1 of operation mode transitions of the input apparatus 1.

The MPU 60 of the input apparatus 1 is assumed to be set so that a transition is made from the active mode (Active) to the sleep 1 mode (Sleep 1) in 30 seconds after the input apparatus 1 has become stationary, a transition is made from the sleep 1 mode (Sleep 1) to the sleep 2 mode (Sleep 2) in one minute after having become stationary, and a transition is made to the off mode (Off) in five minutes after having become stationary.

EXAMPLE 1

Example 1 shows a case where the input apparatus 1 is used by the user as in (1) to (7) below: (1) the power of the input apparatus 1 is turned on, (2) normal operation, (3) the stationary condition of the input apparatus 1 continues for 45 seconds, (4) normal operation, (5) the stationary condition continues for two minutes, (6) normal operation, and (7) the stationary condition continues for five minutes.

(1) The user turns on the power of the input apparatus 1.

As described above, the MPUs 50 and 60 make a transition to the reset mode (POR) immediately after the power is turned on. After that, immediately after completing initialization of its hardware, the MPU 60 outputs the active command (Active command) to the MPU 50 and makes a transition to the disconnect mode (Disconnect). The MPU 50 shifts to the device initialization processing, completes initialization, and makes a transition to the initialization mode (Init).

(2) The user operates the input apparatus 1 normally.

The MPU 60 establishes a connection of radio communication with the control apparatus 40 and makes a transition to the active mode (Active). The MPU 50 receives the active command (Active command) from the MPU 60 and makes a transition from the initialization mode (Init) to the active mode (Active).

(3) The user places the input apparatus 1 on, for example, a desk and maintains it in the stationary condition for 45 seconds.

When 30 seconds have elapsed since having become stationary, the MPU 60 makes a transition from the active mode (Active) to the sleep 1 mode (Sleep 1). In other words, when a predetermined time (for example, 30 seconds) has elapsed since judging that the velocity values $V_x$ and $V_y$ are both zero and the buttons 11, 12, 13, and the like are all in the off condition, the MPU 60 makes a transition to the sleep 1 mode (Sleep 1) and also transmits the sleep 1 command (Sleep 1 command) to the MPU 50. The MPU 60 sets the MPU 60 itself to the power-saving mode after transmitting the sleep 1 command (Sleep 1 command).

Upon receiving the sleep 1 command (Sleep 1 command), the MPU 50 makes a transition to the sleep 1 mode (Sleep 1), turns off the switch 51 to turn off the power of the angular velocity sensor unit 15, sets the acceleration sensor unit 16 to transmit the interrupt signal to the MPU 50 by detection of the movement of the input apparatus 1, and thereafter sets the MPU 50 itself to the power-saving mode.

(4) The user operates the input apparatus 1 normally by, for example, lifting the input apparatus 1 placed on the desk.

The acceleration sensor unit 16 detects the movement of the input apparatus 1 at this time and transmits a detection signal being the motion event (Motion Event) to the MPU 50. Based on this motion event, the MPU 50 is restored from the sleep 1 mode (Sleep 1) to the active mode (Active). At this time, the MPU 50 outputs the report event (Report Event) to the MPU 60. By this report event (Report Event), the MPU 50 restores the MPU 60 in the sleep 1 mode (Sleep 1) to the active mode (Active).

(5) The user places the input apparatus 1 on, for example, the desk and maintains it in the stationary condition for two minutes.

At this time, the MPUs 50 and 60 make a transition to the sleep 1 mode (Sleep 1) when 30 seconds have elapsed since having become stationary as described above. In other words, the MPU 60 sets the MPU 60 itself to the power-saving mode. The MPU 50 makes a transition to the sleep 1 mode (Sleep 1), turns off the power of the angular velocity sensor unit 15, sets the acceleration sensor unit 16 to transmit the interrupt signal to the MPU 50 by detection of the movement of the input apparatus 1, and thereafter sets the MPU 50 itself to the power-saving mode.

When a condition where the user is not operating the input apparatus 1 continues for one minute, the MPU 60 makes a transition from the sleep 1 mode (Sleep 1) to the sleep 2 mode (Sleep 2). In other words, the MPU 60 makes a transition to the sleep 2 mode (Sleep 2) and also transmits the sleep 2 command (Sleep 2 command) to the MPU 50. The MPU 60 sets the MPU 60 itself to the power-saving mode after transmitting the sleep 2 command (Sleep 2 command).

Upon receiving the sleep 2 command (Sleep 2 command), the MPU 50 makes a transition to the sleep 2 mode (Sleep 2), turns off the switch 52 to turn off the power of the acceleration sensor unit 16, and sets the MPU 50 itself to the power-saving mode.

Thus, the supply of power to the acceleration sensor unit 16 in addition to the angular velocity sensor unit 15 is turned off.

(6) In the sleep 2 mode, the user operates at least one button out of the buttons 11, 12, and 13 of the input apparatus 1.

When at least one button out of the buttons 11, 12, and 13 is operated, the button event (Button Event) is input to the MPU 50. When the button event (Button event) is input, the MPU 50 is restored from the sleep 2 mode (Sleep 2) to the active mode (Active). At this time, the MPU 50 transmits the report event (Report Event) to the MPU 60. By this report event (Report Event), the MPU 50 restores the MPU 60 in the sleep 2 mode (Sleep 2) to the active mode (Active).

(7) The user places the input apparatus 1 on, for example, the desk and maintains it in the stationary condition for five minutes.

As described above, when the stationary condition of the input apparatus 1 has continued for 30 seconds since having become stationary, both the MPUs 50 and 60 make a transition to the sleep 1 mode (Sleep 1), and when the stationary condition has continued for one minute since having become stationary, both the MPUs 50 and 60 make a transition to the sleep 2 mode (Sleep 2).

Then, when the stationary condition of the input apparatus 1 has continued for five minutes since having become stationary, the MPU 60 makes a transition from the sleep 2 mode (Sleep 2) to the off mode (Off).

Upon making the transition to the off mode (Off), the MPU 60 transmits the power off command (Power Off command) to the MPU 50 to set it to the power off mode (Power OFF). After that, the MPU 60 enters the standby condition until the power supply to the entire system is turned off.

Upon receiving the power off command (Power Off command), the MPU 50 executes necessary processing including parameter storage and the like, and thereafter sets the shutdown switch 48 of the DC-DC converter 26 to low and cuts off the power supplied to the entire input apparatus 1.

As described above, according to Example 1, the input apparatus 1 can make the transition to the sleep 1 mode (Sleep 1) when 30 seconds have elapsed since having become stationary, make the transition to the sleep 2 mode (Sleep 2) when one minute has elapsed since having become stationary, and turn off the power of the entire input apparatus 1 when five minutes have elapsed since having become stationary. In other words, by making the operation mode transitions of the input apparatus 1 stepwise according to the time elapsed since having become stationary, delicate power saving can be realized. Specifically, by setting the time from after becoming stationary to the transition from the active mode (Active) to the sleep 1 mode (Sleep 1) to as short as 30 seconds, the power consumption of the angular velocity sensor unit 15 which requires a high power consumption can be reduced to zero in a short time after having become stationary. Further, the power of the entire input apparatus 1 can be automatically turned off with certainty in five minutes after having become stationary, thereby enabling power saving.

Moreover, the input apparatus 1 can be restored using the detection signals from the acceleration sensor unit 16 in the sleep 1 mode (Sleep 1), and restored based on the on/off signals from the buttons 11, 12, and 13 in the sleep 2 mode (Sleep 2). Therefore, the user can restore the operation mode of the input apparatus 1 to the active mode (Active) simply by swinging the input apparatus 1 or pressing the button 11 and the like.

Further, with such a structure that an ON-operation can be made to the shutdown switch 48 (set to High) by an input operation to the buttons 11 to 13 or other dedicated switches in the power off mode, the input apparatus 1 can be forcibly restored to the active mode.

FIG. 20 is a diagram showing Example 2 of operation mode transitions of the input apparatus 1.

EXAMPLE 2

Example 2 shows a case where the input apparatus 1 is used as in (1) to (4) below: (1) the power of the input apparatus 1 is turned on, (2) normal operation, (3) detachment of the reception device (transceiver 38), and (4) the stationary condition continues for five minutes. It should be noted that (1) and (2) are the same as (1) and (2) of FIG. 19, so descriptions thereof will be omitted.

In (2) of FIG. 20, both the MPU 50 and the MPU 60 make a transition to the active mode (Active).

(3) When the input apparatus 1 is in the active mode (Active), the user detaches the transceiver 38 from the control apparatus 40.

The MPU 60 judges that the connection of radio communication between the input apparatus 1 and the control apparatus 40 is disabled and makes a transition to the disconnect mode (Disconnect).

(4) The user places the input apparatus 1 on, for example, the desk and maintains it in the stationary condition for five minutes.

As described above, both the MPUs 50 and 60 make a transition to the sleep 1 mode (Sleep 1) when the stationary condition of the input apparatus 1 has continued for 30 seconds since having become stationary, and both the MPUs 50 and 60 make a transition to the sleep 2 mode (Sleep 2) when the stationary condition has continued for one minute since having become stationary.

After that, when the stationary condition of the input apparatus 1 has continued for five minutes since having become stationary, the connection with the control apparatus 40 is disabled for five minutes, and the MPU 60 makes a transition from the sleep 2 mode (Sleep 2) to the off mode (Off).

Upon making the transition to the off mode (Off), the MPU 60 transmits the power off command (Power Off command) to the MPU 50. After that, the MPU 60 enters the standby condition until the power supply to the entire system is turned off.

Upon receiving the power off command (Power Off command), the MPU 50 executes necessary processing including parameter storage and the like, and thereafter sets the shutdown switch 48 of the DC-DC converter 26 to low and cuts off the power supplied to the entire input apparatus 1.

As described above, according to Example 2, it is possible that, when the radio communication between the input apparatus 1 and the control apparatus 40 is disabled and the stationary condition continues for, for example, five minutes thereafter, the MPU 50 executes necessary processing including parameter storage and the like, and thereafter sets the shutdown switch 48 of the DC-DC converter 26 to low and cuts off the power supplied to the entire input apparatus 1. Therefore, for example, when the transceiver 38 is detached from the control apparatus 40, electric power can be prevented from being wastefully consumed by the angular velocity sensor unit 15 and the acceleration sensor unit 16.

Next, a description will be given on another embodiment. It should be noted that in this and subsequent embodiments, structures the same as those of the above embodiments are denoted by the same reference symbols, and descriptions thereof will be omitted. Points different therefrom will mainly be described.

Figure 21:
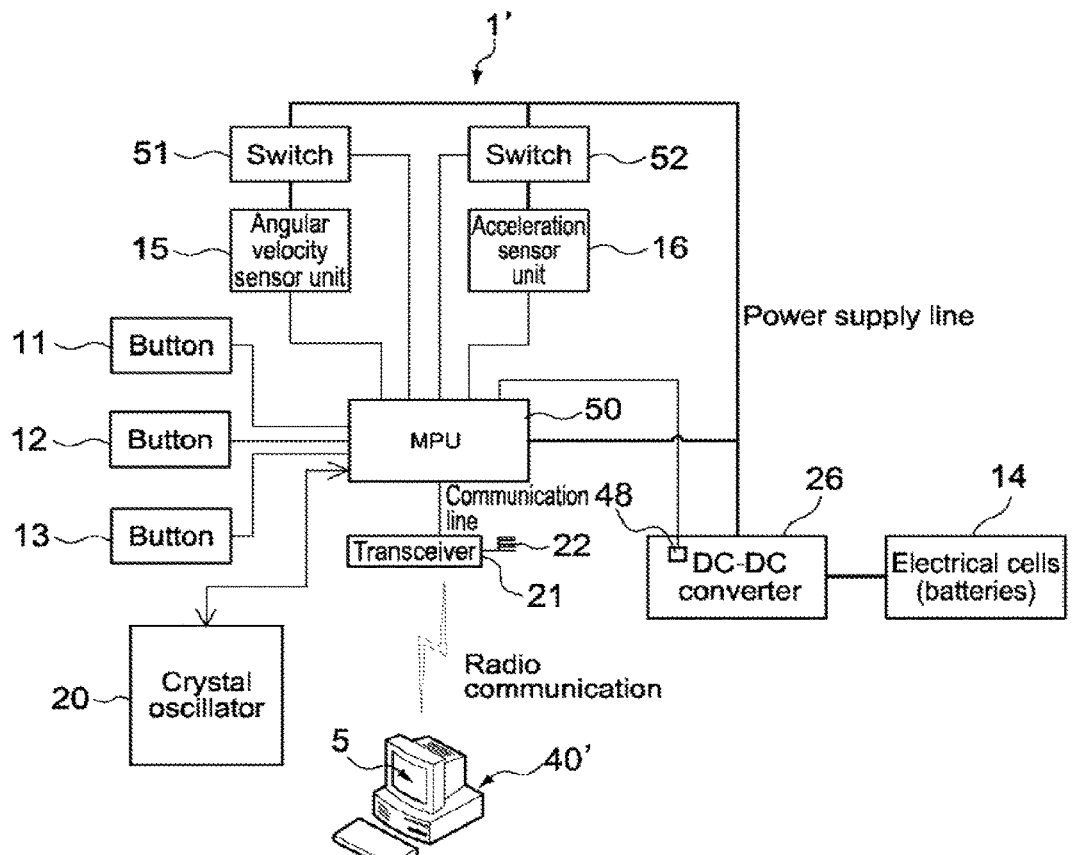
FIG. 21 is a diagram showing a structure of an input apparatus of another embodiment.

FIG. 21 is a diagram showing a structure of an input apparatus of another embodiment.

As shown in the figure, an input apparatus 1' differs from the input apparatus 1 shown in FIG. 5 in that it does not include the MPU 60 and the transceiver 21 is connected to a communication line of the MPU 50.

The MPU 50 outputs, for example, the detection values $(a_x, a_y)$ and $(\omega_x, \omega_y)$ shown in FIG. 14 and the on/off signals of the buttons 11, 12, and 13 using the transceiver 21.

A control apparatus 40' of this embodiment receives signals from the MPU 50 (transceiver 21) shown in FIG. 21 by the transceiver 38 shown in FIG. 1. The control apparatus 40' includes an MPU 35' as shown in FIG. 1, and the MPU 35' has a function of the MPU 60 shown in FIG. 5. In other words, the MPU 35' judges a usage condition of the input apparatus 1' based on the received signals. That is to say, the MPU 35' judges, based on the detection values ($a_x$, $a_y$) and ($\omega_x$, $\omega_y$) and the signals from the buttons 11, 12, and 13 transmitted from the MPU 50, whether the input apparatus 1' is in an operated condition or an unoperated condition.

The MPU 35' outputs a result of the judgment to the transceiver 21 (MPU 50) of the input apparatus 1' via the transceiver 38. Based on the judgment result, the MPU 35' causes a transition of the operation mode of the MPU 35' itself.

Based on the judgment result transmitted from the MPU 35' (transceiver 38), the MPU 50 causes the MPU 50 to make a transition to the sleep 1 mode (Sleep 1), the sleep 2 mode (Sleep 2), the disconnect mode (Disconnect), the active mode (Active), or the like.

As described above, according to this embodiment, the input apparatus 1' shown in FIG. 21 detects the angular velocity values and the acceleration values by the angular velocity sensor unit 15 and the acceleration sensor unit 16, respectively, but since the MPU 60 is not included, no judgment is made on the operation condition of the input apparatus 1' and to which operation mode a transition is to be made. However, the MPU 35' of the control apparatus 40' can have a judgment function of the MPU 60 shown in FIG. 5 and transmit the judgment result to the input apparatus 1'. Therefore, as in the above embodiments, the MPU 50 can cause the angular velocity sensor unit 15 and the acceleration sensor unit 16 to make transitions to the power-saving modes such as the sleep 1 mode and the sleep 2 mode. In other words, as in the above embodiments, the power saving of the input apparatus 1' shown in FIG. 21 can be achieved, and the size, weight, and cost of the input apparatus 1' can be reduced.

Figure 22:
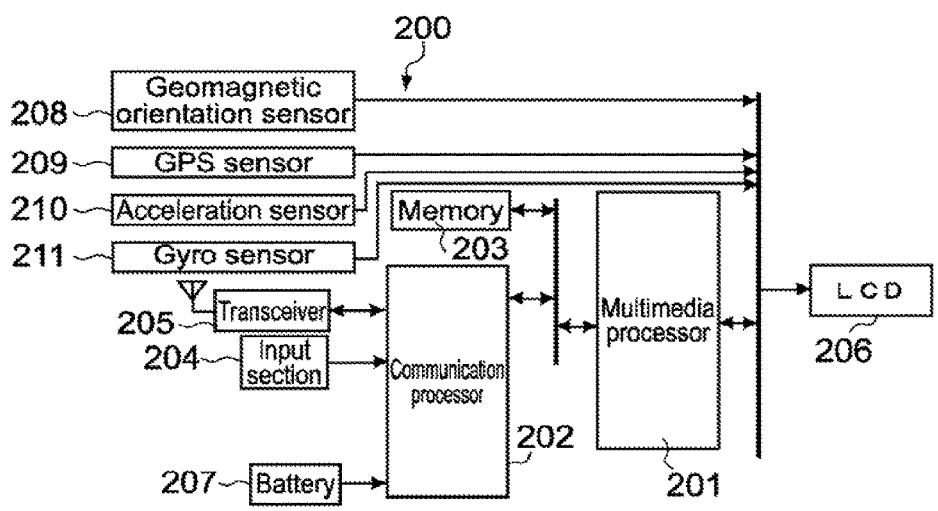
FIG. 22 is a block diagram showing a structure of a cellular phone according to another embodiment.

FIG. 22 is a block diagram showing a structure of a cellular phone as an electronic apparatus according to another embodiment.

As shown in the figure, a cellar phone 200 includes a multimedia processor 201, a communication processor 202, a memory 203, an input section 204, a transceiver 205 having a transmitting function and a receiving function, an LCD display section 206, a battery 207, a geomagnetic orientation sensor 208, a GPS sensor 209, an acceleration sensor 210, an angular velocity sensor (gyro sensor) 211, and the like.

The multimedia processor 201 generates image data to be displayed on the LCD display section 206 based on a control signal, and performs operational processing on signals from the geomagnetic orientation sensor 208, the GPS sensor 209, the acceleration sensor 210, and the angular velocity sensor 211.

When a predetermined time (for example, 30 seconds) has elapsed since the cellar phone 200 became stationary, the multimedia processor 201 performs control so as to stop power supply to sensors other than, for example, the acceleration sensor 210 out of the geomagnetic orientation sensor 208, the GPS sensor 209, the acceleration sensor 210, and the angular velocity sensor (gyro sensor) 211 (Sleep 1). At this time, the multimedia processor 210 may set itself to the power-saving condition. The power-saving condition of the multimedia processor 201 at this time is, for example, a condition where supply of electric power to circuits required for output processing of sensors other than the acceleration sensor 210 is stopped. When the acceleration sensor 210 detects acceleration values or when an input signal from the input section 204 is detected, the multimedia processor 201 transmits those signals to the communication processor 202, and the communication processor 202 judges, based on those signals, whether or not the cellar phone 200 is being operated, and transmits a result of the judgment to the multimedia processor 201. Based on the judgment result, the multimedia processor 201 resumes the supply of power to the sensors, the supply of the power to which has been stopped, so that restoration is made from the sleep 1 mode (Sleep 1) to the active mode (Active).

When a predetermined time (for example, one minute) has elapsed since having become stationary, the multimedia processor 201 performs control so as to stop the supply of power to the geomagnetic orientation sensor 208, the GPS sensor 209, the acceleration sensor 210, and the angular velocity sensor (gyro sensor) 211 (Sleep 2). At this time, the multimedia processor 210 may set itself to the power-saving condition. The power-saving condition of the multimedia processor 201 at this time is, for example, a condition where supply of electric power to circuits required for output processing of the geomagnetic orientation sensor 208, the GPS sensor 209, the acceleration sensor 210, and the angular velocity sensor (gyro sensor) 211 is stopped. When detecting the input signal from the input section 204, the multimedia processor 201 resumes the supply of power to the sensors, the supply of power to which has been stopped, and restores the sleep 2 mode (Sleep 1) to the active mode (Active).

The communication processor 202 performs control so as to reproduce transmission data by detecting, using a modem section (not shown), a signal subjected to demodulation processing by the transceiver 205, selectively extract only transmission data of a channel to be received by the cellular phone 200 out of the transmission data using a TDMA section (not shown), and supply the extracted transmission data to a codec (not shown) for reproducing call data. The transceiver 205 is constituted of a reception section for demodulating a radio signal from an antenna, a transmission section for modulating a transmission signal from the communication processor, and the like.

The communication processor 202 makes a transition to the sleep 1 mode (Sleep 1) according to a time elapsed since having become stationary, and sets itself to the power-saving condition. The power-saving condition of the communication processor 202 at this time is, for example, a condition where the reception cycle of signals from the multimedia processor 201 is longer than that in the normal mode. Accordingly, electric power consumed by the communication processor 202 can be cut down.

The communication processor 202 makes a transition to the sleep 2 mode (Sleep 2) according to a time elapsed since having become stationary, and sets itself to the power-saving condition. The power-saving condition of the communication processor 202 at this time is, for example, a condition where a standby current necessary to receive a report event (Report Event) from the multimedia processor 201 is flowing in the communication processor 202. Accordingly, the electric power consumed by the communication processor 202 can be cut down.

When a predetermined time (for example, five minutes) has elapsed since the cellular phone 200 became stationary, the communication processor 202 makes a transition from the sleep 2 mode (Sleep 2) to the off mode (Off).

Upon making the transition to the off mode (Off), the communication processor 202 transmits the power off command (Power Off command) to the multimedia processor 201 to set the power off mode (Power Off). After that, the communication processor 202 enters the standby condition until the power supply to the entire system is turned off.

Upon receiving the power off command (Power Off command), the multimedia processor 201 executes necessary processing including parameter storage and the like, and thereafter sets a shutdown switch of a DC-DC converter (not shown) to low and cuts off the power supplied to the cellular phone 200. Further, because a power switch is structured so that an ON-operation can be made by an input operation to the input section 204 or other dedicated input sections in the power off mode, the cellular phone 200 can forcibly be restored to the active mode.

The LCD display section 206 displays still images, moving images, and the like.

The battery 207 supplies electric power to the geomagnetic orientation sensor 208, the GPS sensor 209, the acceleration sensor 210, the angular velocity sensor (gyro sensor) 211, the communication processor 202, and the like.

The geomagnetic orientation sensor 208 includes, for example, an MI (Magnet Impedance) sensor. The MI sensor obtains, for example, an orientation by using a phenomenon in which, when a GHz-band pulse current is passed through a zero-magnetostrictive amorphous wire in which magnetic spins are arranged in a circumferential direction, an impedance variation occurs in proportion to an external magnetic field.

Similar to the input apparatus 1 of the first embodiment, the cellular phone 200 is also equipped with sensors, and is also required to reduce power consumption. Therefore, the application of the technical idea of the present application is of very large significance.

As described above, according to this embodiment, the cellular phone 200 includes the multimedia processor 201 and the communication processor 202 and can control the supply of power to the geomagnetic orientation sensor 208, the GPS sensor 209, the acceleration sensor 210, and the angular velocity sensor (gyro sensor) 211 stepwise (Sleep 1, Sleep 2, Off) according to the time elapsed since the cellular phone 200 has become stationary. Therefore, power saving efficiency of the cellular phone 200 can be improved.

It should be noted that in this embodiment, in the sleep 1 mode, the acceleration sensor 210 is used as a sensor for detecting a trigger for restoration to the active mode. However, sensors other than the acceleration sensor 210, such as the angular velocity sensor (gyro sensor) 211 may be used for detecting the trigger. Needless to say, it is most efficient from the standpoint of reduction of power consumption to use a sensor whose consumption current in the sleep 1 mode (Sleep 1) is the smallest, for detecting the trigger.

In other words, for example, when the geomagnetic orientation sensor 208, the GPS sensor 209, the acceleration sensor 210, and the angular velocity sensor (gyro sensor) 211 can each be brought into the power-saving condition, it is possible to bring, out of the geomagnetic orientation sensor 208, the GPS sensor 209, the acceleration sensor 210, and the angular velocity sensor (gyro sensor) 211, a sensor whose power consumption in the power-saving condition is the lowest into the power-saving condition, and stop the supply of power to the sensors other than the sensor in the power-saving condition.

Moreover, in the above example, the description has been given with the cellular phone 200 equipped with three or more sensors as an example, but in the case of a cellular phone equipped with the geomagnetic orientation sensor 208 and the acceleration sensor 210, for example, the acceleration sensor 210 may be used as the sensor for detecting the trigger.

For example, in the cellular phone, the acceleration sensor is used for counting the number of steps or calculating a movement distance thereof on a map. The geomagnetic orientation sensor realizes functions of detecting a direction when taking pictures and automatically turning a map displayed on a screen so that a traveling direction always points to the top of the screen. By combining the two, his/her own position on the map can be calculated and displayed.

An MI sensor, a Hall sensor, an MR sensor, an FG sensor, or the like is used as the geomagnetic orientation sensor, and an application of the MI sensor using an MI element is expanding in a situation where size reduction, power saving, and higher precision are required.

The MI sensor uses the phenomenon in which, when the GHz-band pulse current is passed through the zero-magnetostrictive amorphous wire in which magnetic spins are arranged in the circumferential direction, an impedance variation occurs in proportion to the external magnetic field. However, the pulse current is always actively passed. A general consumption current is 2 mA to 3 mA at 3 V drive. It can be seen that it is 2 to 10 times as high as that of the acceleration sensor.

When combining those sensors, a use of the acceleration sensor as the trigger for restoration from the sleep 1 mode (Sleep 1) to the active mode (Active) exhibits an effect of keeping the consumption current to about ½ to ¹⁄₁₀.

Further, in the case of a cellular phone equipped with an optical sensor (such as CMOS) and an acceleration sensor, the acceleration sensor may be used as the sensor for detecting the trigger for restoration from the sleep 1 mode (Sleep 1).

For example, the optical sensor (such as a CMOS sensor) is used for, for example, processing an image captured by the optical sensor to estimate the user's behavior from the following (1) to (3). (1) Whether the user is swinging the cellular phone, for example (game application). (2) Whether someone is in front (game application). (3) How a surrounding landscape is (specification of a place by a combination thereof with map data)

The optical sensor (such as CMOS) is a sensor for capturing an image and, at the same time, serves as an optical image sensor. By using the function as the optical image sensor, it is possible to judge that the cellular phone (such as a remote controller) is held when an entire surface of the screen is moved in the same direction, to wake up.

Incidentally, a general consumption current of the image sensor is about 50 mA to 100 mA at 3 V drive. On the other hand, a general consumption current of the acceleration sensor is about 0.2 mA to 1 mA at 3 V drive.

A comparison between them shows that the consumption current of the acceleration sensor is about ¹⁄₅₀ to ¹⁄₅₀₀.

In the case of the combination of those sensors, the use of the acceleration sensor as the trigger for restoration from the sleep 1 mode (Sleep 1) produces the effect of keeping the consumption current to about ¹⁄₅₀ to ¹⁄₅₀₀.

Further, also in the case of a cellular phone equipped with a GPS sensor and an acceleration sensor, the acceleration sensor may be used as the sensor for detecting the trigger.

Furthermore, in the case of a cellular phone equipped with an optical sensor (such as a CMOS), an acceleration sensor, and a gyro sensor, the acceleration sensor may be used as the sensor for detecting the trigger. Because the cellular phone 200 is equipped with the angular velocity sensor (gyro sensor) 211 as described with reference to FIG. 22, a shake correction function of (a camera of) the cellular phone 200 is incorporated.

In the case of this combination, by using the acceleration sensor as the trigger for restoration from the sleep 1 mode (Sleep 1), the effect of keeping the consumption current to about ¹⁄₅₀ to ¹⁄₅₀₀ is produced.

Next, a description will be given on an embodiment of a digital camera as an electronic apparatus.

Figure 23:
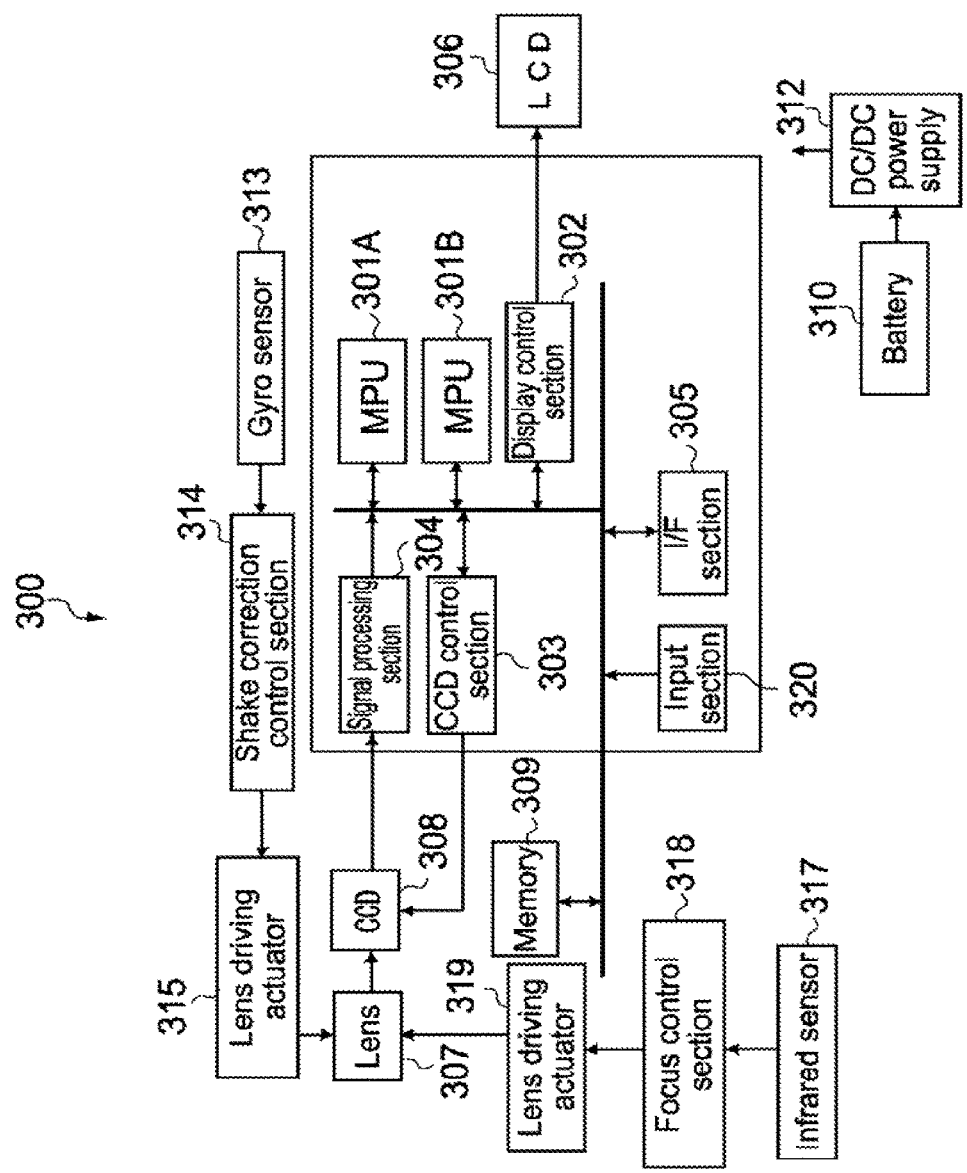
FIG. 23 is a block diagram showing a structure of a digital camera according to another embodiment.

FIG. 23 is a block diagram showing a structure of the digital camera according to this embodiment.

As shown in FIG. 23, a digital camera 300 includes an MPU 301A, an MPU 301B, a display control section 302, a CCD control section 303, a signal processing section 304, an interface (I/F) section 305, an LCD 306, a lens 307, a CCD 308, a memory 309, a battery 310, a DC/DC power supply 312, an angular velocity sensor (gyro sensor) 313, a shake correction control section 314, a lens driving actuator 315, an infrared sensor 317, a focus control section 318, a lens driving actuator 319, and an input section 320.

The MPU 301A judges, based on detection signals from the infrared sensor 317, the angular velocity sensor 313, and the input section 320, whether or not the digital camera 300 is being operated. The MPU 301A transmits a result of the judgment to the MPU 301B. Based on the received judgment result, the MPU 301B controls supply of power to the infrared sensor 317 and the angular velocity sensor 313. In other words, based on the received judgment result, the MPU 301B causes the MPU 301A and the MPU 301B to make transitions from the active mode (Active) to the sleep 1 mode (Sleep 1), the sleep 2 mode (Sleep 2), and the off mode (Off).

For example, when judging that a predetermined time (for example, 30 seconds) has elapsed since the digital camera 300 has been brought into the stationary condition, the MPU 301A transmits the sleep 1 command to the MPU 301B and sets itself to the power-saving condition. The power-saving condition of the MPU 301A at this time is, for example, a condition where the reception cycle of signals from the MPU 301B is longer than that in the normal mode. Accordingly, electric power consumed by the MPU 301A can be cut down. The MPU 301B receives the sleep 1 command, turns off the power of the infrared sensor 317, sets the angular velocity sensor (gyro sensor) 313 to the power-saving mode, and sets itself to the power-saving condition. The power-saving condition of the MPU 301B at this time is, for example, a condition where supply of electric power to circuits required for output processing of sensors other than the angular velocity sensor 313 is stopped. Accordingly, electric power consumed by the MPU 301B can be reduced.

For example, when judging that a predetermined time (for example, one minute) has elapsed since the digital camera 300 has been brought into the stationary condition, the MPU 301A transmits the sleep 2 command to the MPU 301B and sets itself to the power-saving condition. The power-saving condition of the MPU 301A at this time is, for example, a condition where a standby current necessary to receive a report event (Report Event) from the MPU 301A is flowing in the MPU 301B. Accordingly, the electric power consumed by the MPU 301B can be cut down. The MPU 301B receives the sleep 2 command, turns off the power of the angular velocity sensor (gyro sensor) 313 in addition to the infrared sensor 317, and sets itself to the power-saving condition. The power-saving condition of the MPU 301B at this time is, for example, a condition where supply of electric power to circuits required for output processing of the infrared sensor 317 and the angular velocity sensor (gyro sensor) 313 is stopped. Accordingly, the electric power consumed by the MPU 301B can be cut down.

For example, when judging that a predetermined time (for example, five minutes) has elapsed since the digital camera 300 has been brought into the stationary condition, the MPU 301A causes the MPU 301A to make a transition to the off mode (Off), and transmits the power off command to the MPU 301B. The MPU 301B receives this power off command, transmits a power supply off command for setting a shutdown switch (not shown) of the DC/DC power supply 312 to low to the shutdown switch, and turns off the power supplied to the entire system of the digital camera 300.

In the sleep 1 mode, the MPU 301A loads detection signals detected by the angular velocity sensor (gyro sensor) 313 and the input section 320 at predetermined time intervals, and judges, based on the loaded detection signals, whether or not the digital camera 300 is being operated. The MPU 301A transmits a result of the judgment to the MPU 301B. Based on the received judgment result, the MPU 301B causes the angular velocity sensor (gyro sensor) 313 and the infrared sensor 317 to make a transition to the active mode (Active), or causes the MPU 301A to make a transition to the off mode (Off).

In the sleep 2 mode, the MPU 301A loads detection signals detected by the input section 320 such as a button at predetermined time intervals, and judges, based on the loaded detection signals, whether or not the digital camera 300 is being operated. The MPU 301A transmits a result of the judgment to the MPU 301B. Based on the received judgment result, the MPU 301B causes the angular velocity sensor (gyro sensor) 313 and the infrared sensor 317 to make a transition to the active mode (Active) or causes the MPU 301A to make a transition to the off mode (Off).

Based on a control signal from the MPU 301A, the display control section 302 outputs a signal for displaying an image on the LCD 306.

The CCD control section 303 outputs signals for controlling processing timings of the CCD 308 and an AD converter (not shown) for converting an analog signal from the CCD 308 into a digital signal, to the CCD 308 and the AD converter.

The signal processing section 304 performs image processing based on the output signal from the CCD 308 converted into the digital signal by the AD converter (not shown).

The interface section 305 performs an input/output of data among a USB flash memory, an SD card, and the like.

The LCD 306 displays an image captured by the CCD 308 and the like.

The lens 307 focuses light on the CCD 308.

The CCD 308 converts a light signal from a subject into an electric signal.

The DC/DC power supply 312 is connected to the battery 310 and supplies electric power to each of the sections.

Here, the angular velocity sensor (gyro sensor) 313 has the same structure as the angular velocity sensor unit 15 described above. The shake correction control section 314 outputs a signal for controlling the lens driving actuator 315 based on a signal from the angular velocity sensor (gyro sensor) 313, and drives the lens driving actuator 315 to perform shake correction.

The infrared sensor 317 irradiates the subject with infrared rays for focusing. The focus control section 318 drives the lens driving actuator 319 to perform focus control.

With such a structure, when judging that one minute, for example, has elapsed since the digital camera 300 became stationary, the MPU 301A can cause the MPU 301A to make a transition to the sleep 1 mode and transmit the sleep 1 command to the MPU 301B. The MPU 301B can receive this sleep 1 command, stop the supply of power to the infrared sensor 317, and bring the angular velocity sensor (gyro sensor) 313 into the power-saving mode. Therefore, it is possible to cut down power consumption while dividing processing between the two MPUs 301A and 301B.

When an acceleration acts on the digital camera 300 in the sleep 1 mode, a movement thereof is detected by the angular velocity sensor (gyro sensor) 313, thereby enabling an immediate restoration to the active mode.

When judging that two minutes, for example, have elapsed since the digital camera 300 became stationary, the MPU 301A can cause the MPU 301A to make a transition to the sleep 2 mode and transmit the sleep 2 command to the MPU 301B. The MPU 301B can receive this sleep 2 command and stop the supply of power to the infrared sensor 317 and the angular velocity sensor (gyro sensor) 313. Therefore, power consumption can be cut down more effectively according to the time elapsed.

When the input section 320 of the digital camera 300 is operated in the sleep 2 mode, a restoration to the active mode can be made by detecting a detection signal from the input section 320 by the MPU 301B.

When judging that five minutes, for example, have elapsed since the digital camera 300 became stationary, the MPU 301A can cause the MPU 301A to make a transition to the off mode and transmit the power off command to the MPU 301B. The MPU 301B can receive this power off command and stop the supply of power to the entire system of the digital camera 300. Therefore, when there is a high possibility that the digital camera 300 has been left without being turned off, it is possible to turn off the power and thereby cut down power consumption more effectively. Moreover, with such a structure that an ON-operation can be made to the DC/DC power supply 312 by an input operation to the input section 320 or other dedicated input sections in the power off mode, the digital camera 300 can be forcibly restored to the active mode.

It should be noted that when the power consumption of the infrared sensor 317 is smaller out of the angular velocity sensor (gyro sensor) 313 and the infrared sensor 317, the supply of power to the angular velocity sensor (gyro sensor) 313 only needs to be stopped.

Moreover, the example in which the MPU 301B receives the sleep 1 command, turns off the power of the infrared sensor 317, and sets the angular velocity sensor (gyro sensor) 313 to the power-saving mode has been shown. However, without being limited thereto, it is also possible that, when the infrared sensor 317 and the angular velocity sensor (gyro sensor) 313 can each be brought into the power-saving condition, for example, out of the infrared sensor 317 and the angular velocity sensor (gyro sensor) 313, a sensor whose power consumption in the power-saving condition is lower is brought into the power-saving condition, and the supply of power to the sensor other than the sensor in the power-saving condition is stopped.

Next, another embodiment of the input apparatus will be described.

Figure 24:
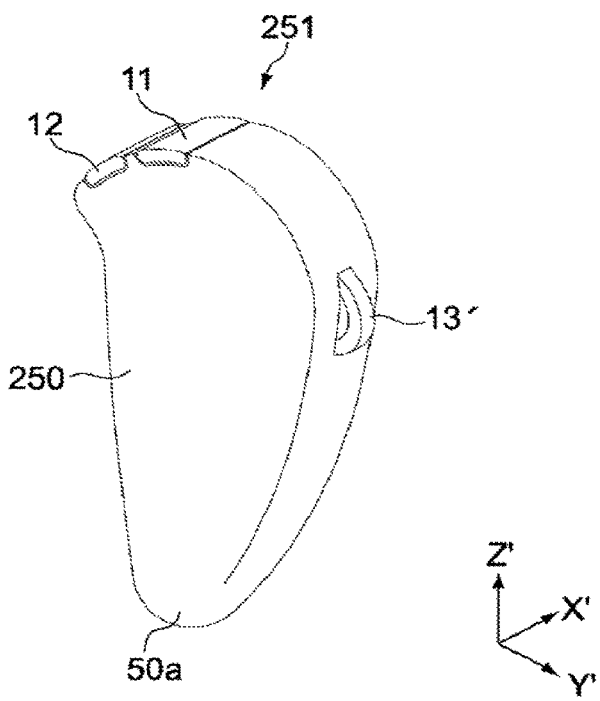
FIG. 24 is a perspective diagram showing an input apparatus 251.
Figure 25:
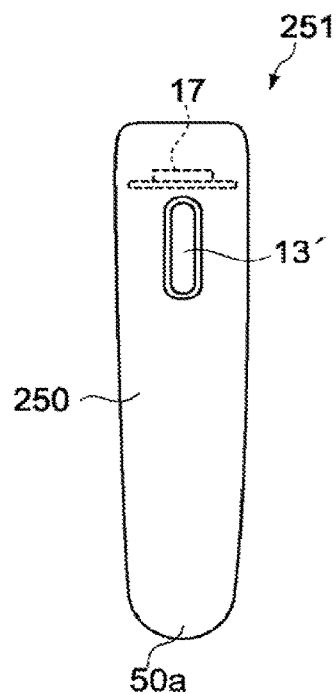
FIG. 25 is a side view of the input apparatus 251 seen from a scroll dial button side.

FIG. 24 is a perspective diagram showing an input apparatus 251. FIG. 25 is a side view of the input apparatus 251 seen from a scroll dial button 13' side. In descriptions below, descriptions on members, functions, and the like of the input apparatus 251 similar to those of the input apparatus 1 shown in FIG. 2 and the like will be simplified or omitted, and points different therefrom will mainly be described.

A casing 250 of the input apparatus 251 includes a partial sphere or partial quadric surface 50a at a predetermined position on a surface of the casing 250. Hereinafter, the partial sphere or partial quadric surface (50a) will be referred to as "lower curved surface" (50a) for convenience.

The lower curved surface 50a is provided at a position almost opposite to the buttons 11 and 12, that is, a position where, when the user holds the input apparatus 251, a pinky is located closer to the lower curved surface 50a than other fingers, for example. Alternatively, in a case where, in the casing 250 elongated in one direction (Z'-axis direction), the sensor unit 17 is provided on a positive side of the Z' axis with respect to a longitudinal center of the casing 250 in the Z'-axis direction, the lower curved surface 50a is provided on a negative side of the Z' axis.

Typically, the partial sphere is substantially a hemisphere, but does not necessarily have to be a hemisphere. The quadric surface is a curved surface obtained by expanding a two-dimensional conic curve (quadric curve) into a 3-dimensional conic curve. Examples of the quadric surface include an ellipsoid surface, an ellipsoid paraboloid surface, and a hyperbolic surface.

Figure 26:
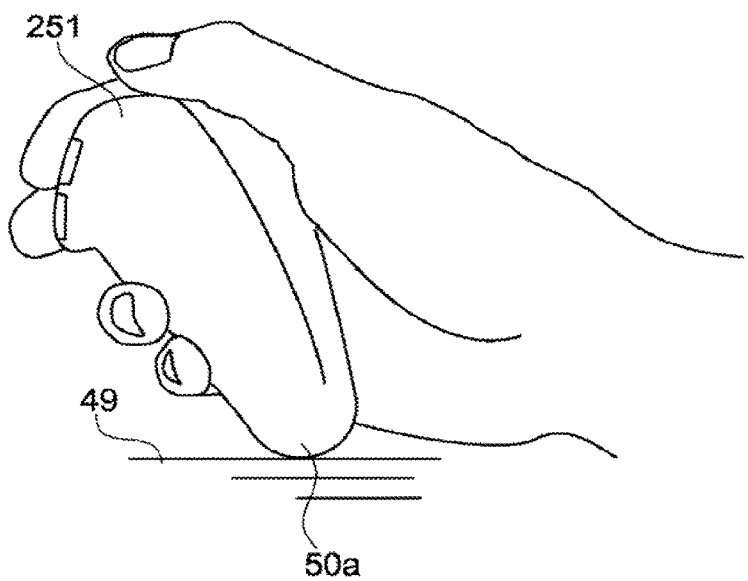
FIG. 26 is a diagram showing a state where the user operates the input apparatus while causing the lower curved surface to abut on a knee.

With the configuration of the casing 250 of the input apparatus 251 as described above, the user can easily operate the input apparatus 251 while causing the lower curved surface 50a of the input apparatus 251 as a fulcrum to abut on a table, a chair, a floor, or a knee or thigh of a user (hereinafter referred to as abutment target object 49). That is, even in the condition where the lower curved surface 50a of the input apparatus 251 abuts on the abutment target object 49, the user can easily incline the input apparatus 251 in diverse angles, thereby enabling delicate operations such as placing a pointer on an icon. FIG. 26 is a diagram showing a state where the user operates the input apparatus 251 while causing the lower curved surface 50a to abut on the knee.

Alternatively, in this embodiment, erroneous operations due to a hand movement, which cannot be suppressed by a shake correction circuit, can be prevented from occurring, and the user is free from fatigue that is caused when the user operates the input apparatus 251 while holding it in the air.

Figure 27:
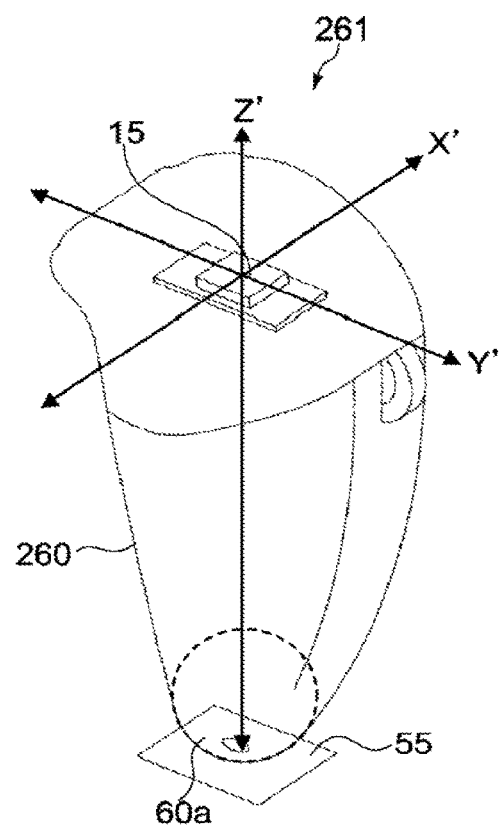
FIG. 27 is a perspective diagram showing an input apparatus according to still another embodiment.

FIG. 27 is a perspective diagram showing an input apparatus according to still another embodiment.

A casing 260 of an input apparatus 261 includes, similar to the input apparatus 251 shown in FIGS. 24 and 25, a lower curved surface 60a constituted of a partial sphere. A plane which is perpendicular to a maximum length direction (Z'-axis direction) of the casing 260 of the input apparatus 261 and is in contact with the lower curved surface 60a (hereinafter, referred to as lower end plane 55 for convenience) is substantially parallel to a plane formed by the X' axis and the Y' axis (see FIG. 4) as detection axes of the angular velocity sensor unit 15 (X'-Y' plane).

With the structure of the input apparatus 261 as described above, in a case where an operation is made by the user while causing the lower curved surface 60a to abut on the lower end plane 55, angular velocities applied to the input apparatus 261 are input to the angular velocity sensor unit 15 as they are. Thus, an amount of calculation required to obtain detection values from the detection signals from the angular velocity sensor unit 15 can be reduced.

Figure 28:
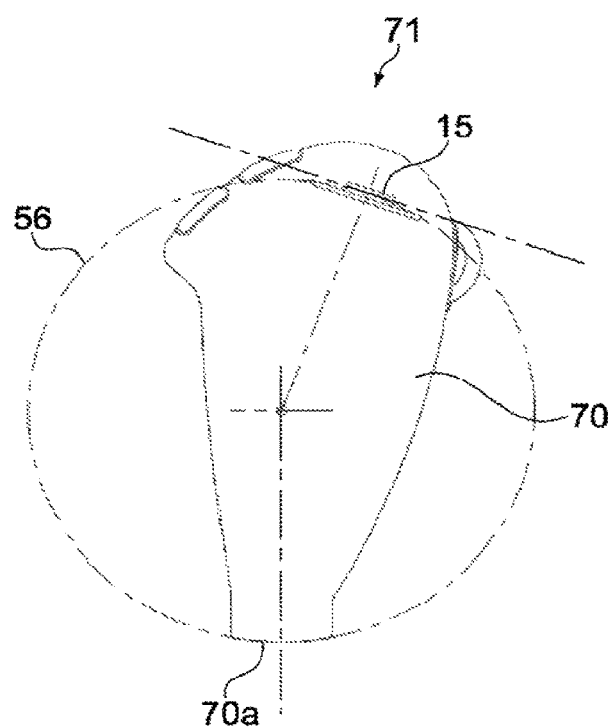
FIG. 28 is a plan view showing an input apparatus according to yet another embodiment.
Figure 29:
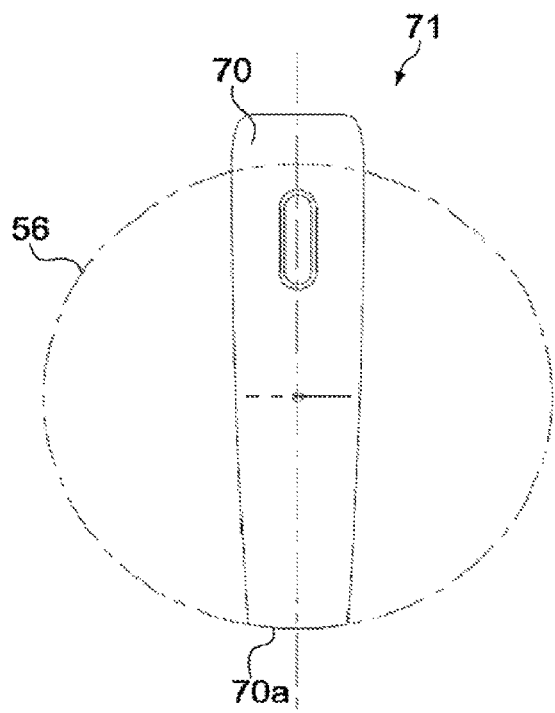
FIG. 29 is a side view showing the input apparatus shown in FIG. 28.

FIG. 28 is a plan view showing an input apparatus according to yet another embodiment. FIG. 29 is a side view showing the input apparatus.

A lower curved surface 70a of a casing 70 of an input apparatus 71 is, for example, a partial sphere. The lower curved surface 70a has a larger curvature radius than the lower curved surfaces 50a and 60a of the input apparatuses 251 and 261 shown in FIGS. 24 and 27. The angular velocity sensor unit 15 is provided at a position at which a straight line contained in the X'-Y' plane formed by the X' axis and the Y' axis as the detection axes of the angular velocity sensor unit 15 corresponds to a tangent line of a virtuallydrawn circle 56 that passes the partial sphere when seen from the X'- and Y'-axis directions. As long as the conditions as described above are satisfied, the angular velocity sensor unit 15 may be provided in the casing 70 such that the X'-Y' plane of the angular velocity sensor unit 15 is tilted with respect to a longitudinal direction of the input apparatus 71 (see FIG. 28).

Accordingly, because a direction of the vector of the angular velocity generated when the user operates the input apparatus 71 while causing the lower curved surface 70*a* thereof to abut on the abutment target object 49 and the detection direction of the angular velocity sensor unit 15 match, a linear input is thus enabled.

Figure 30:
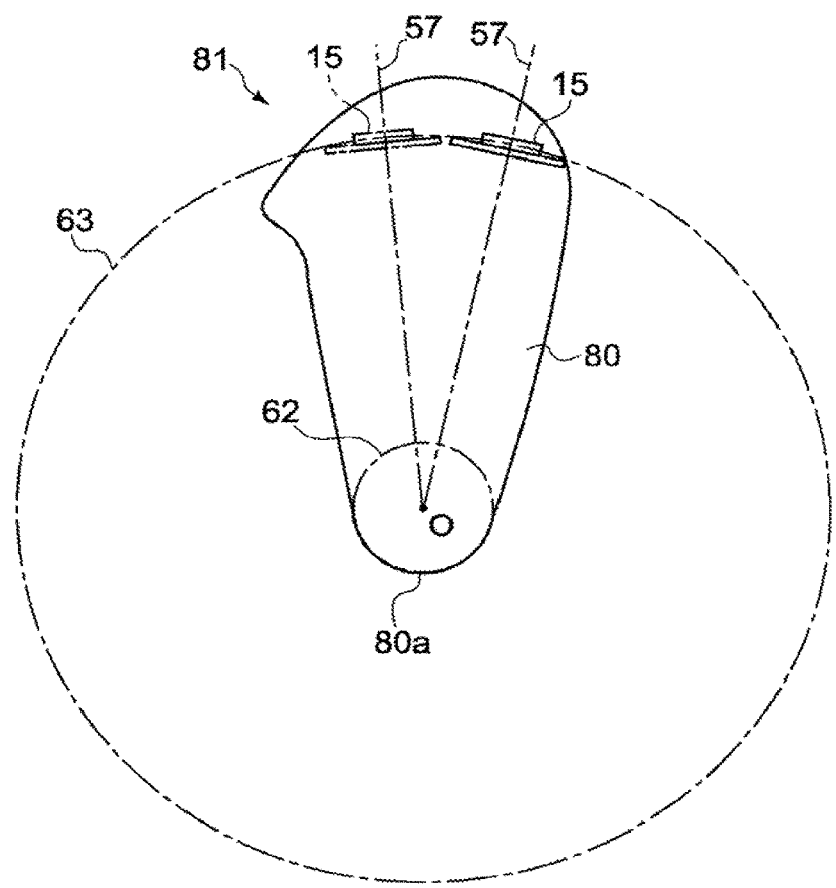
FIG. 30 is a plan view showing an input apparatus according to still another embodiment.

FIG. 30 is a plan view showing an input apparatus according to still another embodiment.

A sphere as a lower curved surface 80*a* of a casing 80 of an input apparatus 81 has a curvature radius the same as or close to that shown in FIG. 24, for example. Regarding the angular velocity sensor unit 15, a virtual straight line 57 that passes an intersection of the X' axis and the Y' axis, which is a center point of the angular velocity sensor unit 15, and is orthogonal to the X' axis and the Y' axis passes a center point O of a first sphere 62 including the lower curved surface 80*a*. With the structure as described above, the first sphere 62 including the lower curved surface 80*a* and a second sphere 63 in which the straight line 57 contained in the X'-Y' plane of the angular velocity sensor unit 15 becomes a tangent line are arranged concentrically. Therefore, the input apparatus 81 bears the same effect as the input apparatus 71 shown in FIG. 28.

The input apparatus 251, 261, 71, or 81 including the partial sphere or the partial quadric surface described above does not necessarily need to be operated by the user while the lower curved surface 50*a*, 60*a*, 70*a*, or 80*a* thereof is abutted against the abutment target object 49, and may of course be operated in air.

Various modifications can be made to the embodiments described above.

The above embodiment is applied to the digital camera 300 has been described while taking the digital camera 300 equipped with the gyro sensor 313 and the infrared sensor 317 as an example, but the embodiment is applicable not only to the digital camera but also to various electronic apparatuses including a portable terminal apparatus such as a PDA.

In the case of a digital camera equipped with, for example, a gyro sensor and an image pickup image sensor, the gyro sensor may be used as the sensor for detecting the trigger.

The gyro sensor is used for shake correction. The image pickup image sensor is used for taking images and, as described in the case of the cellular phone, can also be used as a wake-up sensor.

Incidentally, a general consumption current of the image pickup image sensor is about 50 mA to 100 mA at 3 V drive. On the other hand, a general consumption current of the gyro sensor is about 6 mA to 12 mA at 3 V drive.

A comparison between them shows that the consumption current of the gyro sensor is about ¼ to ¹/₁₇.

When combining those sensors, the use of the gyro sensor as the trigger for restoration from the sleep 1 mode or the like produces the effect of keeping the consumption current to about ¼ to ¹/₁₇.

Further, after a transition to the sleep 2 mode, the power consumption of the image pickup image sensor can be reduced to zero.

Furthermore, the embodiment are applicable not only to the digital camera but also to an electronic apparatus including an image pickup system.

In addition, the embodiments are also applicable to, for example, a GPS (Global Positioning System) navigation system equipped with a GPS sensor and an acceleration sensor and an input/output apparatus used therefor. In this case, for example, the acceleration sensor only needs to be used as the sensor for detecting the trigger. Moreover, in the case of a GPS navigation system equipped with a GPS sensor and a gyro sensor and an input/output apparatus used therefor, the gyro sensor may be used as the sensor for detecting the trigger.

Moreover, the embodiments are also applicable to, for example, a game machine equipped with an acceleration sensor and a gyro sensor and an input/output apparatus used therefor. In this case, for example, the acceleration sensor only needs to be used as the sensor for detecting the trigger. Further, in the case of a game machine equipped with an acceleration sensor and an optical sensor (such as a CMOS) and an input/output apparatus used therefor, for example, the acceleration sensor may be used as the sensor for detecting the trigger.

Furthermore, the embodiments are also applicable to, for example, a traffic control system equipped with an infrared sensor and an ultrasonic sensor (such as a microwave Doppler transceiver apparatus) and an input/output apparatus used therefor. In this case, for example, the infrared sensor may be used as the sensor for detecting the trigger.

Further, the embodiments are also applicable to, for example, an autonomous travel system for an automobile equipped with a rotary encoder and a GPS sensor and an input/output apparatus used therefor. In this case, for example, the rotary encoder only needs to be used as the sensor for detecting the trigger. In addition, in the case of an autonomous travel system for an automobile equipped with a CMOS sensor and a rotary encoder and an input/output apparatus used therefor, for example, the rotary encoder only needs to be used as the sensor for detecting the trigger.

Moreover, the embodiments are also applicable to, for example, a safety system for an automobile equipped with an alcohol detection sensor and a body heat detection temperature sensor and an input/output apparatus used therefor. In this case, for example, the body heat detection temperature sensor only needs to be used as the sensor for detecting the trigger.

Moreover, the embodiments are also applicable to, for example, a PC equipped with a gyro sensor and a touch pad (touch panel) and an input/output apparatus used therefor. In this case, for example, the gyro sensor only needs to be used as the sensor for detecting the trigger. Further, in the case of a PC equipped with an acceleration sensor and an optical sensor and an input/output apparatus used therefor, for example, the acceleration sensor only needs to be used as the sensor for detecting the trigger.

Furthermore, in the embodiment, in an electronic apparatus equipped with a plurality of sensors such as a gyro sensor, an acceleration sensor, a geomagnetic sensor, an atmospheric pressure sensor, a temperature sensor, an infrared sensor, a pressure sensor, and an optical sensor, one sensor may be used for detecting the trigger as in the above embodiments, but it is of course also possible to use two or more sensors as the sensor for detecting the trigger, to perform detection of the trigger with higher precision.

In the above embodiments, the example in which the MPU 60 judges, based on the velocity values ($V_x$, $V_y$) and the on/off signals from the button 11 and the like acquired from the MPU 50, whether or not the input apparatus 1 is being operated has been shown. However, without being limited thereto, it is also possible that the MPU 50 transmits the angular velocity signals ($\omega_x$, $\omega_y$) from the angular velocity sensor unit 15, the acceleration signals ($a_x$, $a_y$) from the acceleration sensor unit 16, and the on/off signals from the button 11 and the like to the MPU 60, and the MPU 60 judges, based on the angular velocity signals ($\omega_x$, $\omega_y$), the acceleration signals ($a_x$, $a_y$), and the on/off signals from the button 11 and the like, for example, whether or not the input apparatus 1 is being operated. In this case, judgment processing can be shortened.

In the above embodiments, the example in which the MPU 50 calculates the velocity values ($V_x$, $V_y$) based on the detection signals (angular velocity signals ($\omega_x$, $\omega_y$) and acceleration signals ($a_x$, $a_y$)) of the angular velocity sensor unit 15 and the acceleration sensor unit 16, the MPU 50 transmits the velocity values ($V_x$, $V_y$) to the MPU 60 together with the input signals from the button 11 and the like, and the MPU 60 outputs the velocity values and the signals from the button 11 and the like transmitted from the MPU 50 to the control apparatus 40 by radio using the transceiver 21 has been shown. However, without being limited thereto, for example, it is also possible that the MPU 50 calculates the coordinate values X and Y of the pointer based on the velocity values ($V_x$, $V_y$), the MPU 50 transmits the coordinate values X and Y to the MPU 60, and the MPU 60 transmits the coordinate values X and Y to the control apparatus 40 side by radio using the transceiver 21.

In the above embodiments, the example in which the MPU 50 outputs the detection values ($a_x$, $a_y$) and ($\omega_x$, $\omega_y$) and the on/off signals from the buttons 11, 12, and 13 to the control apparatus 40' by the transceiver 21, and the MPU 35' of the control apparatus 40' judges, based on the detection values ($a_x$, $a_y$) and ($\omega_x$, $\omega_y$) and the signals from the buttons 11, 12, and 13 that have been input from the MPU 50, whether the input apparatus 1' is in an operated condition or an unoperated condition has been shown. However, without being limited thereto, for example, it is also possible that the MPU 35' of the control apparatus 40' obtains the velocity values based on the detection values ($a_x$, $a_y$) and ($\omega_x$, $\omega_y$) input from the MPU 50, and judges, based on the velocity values and the signals from the button 11 and the like, whether or not the input apparatus 1' is being operated.

In the above embodiments, the example in which the input apparatus 1 makes transitions to the active mode (Active), the sleep 1 mode (Sleep 1), the sleep 2 mode (Sleep 2), and the disconnect mode (Disconnect) according to the operation conditions of the input apparatus 1 has been shown. At this time, such a structure that the user can visually determine an operation mode that the input apparatus 1 is in is also possible.

Figure 31:
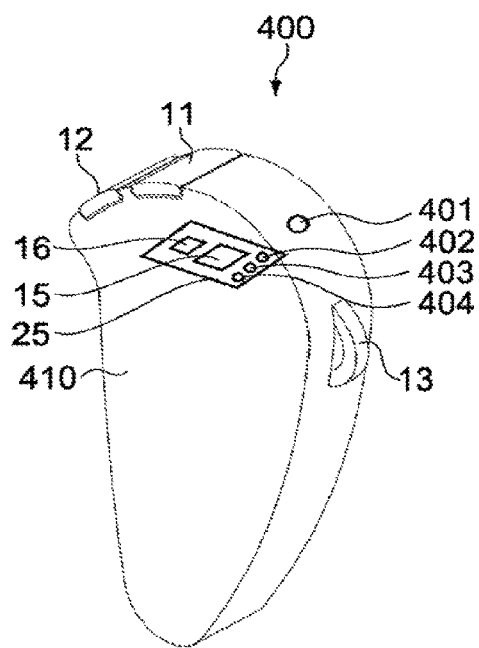
FIG. 31 is a perspective diagram of an input apparatus including a light-emitting section that emits light according to an operation mode.

FIG. 31 is a perspective diagram of an input apparatus including a light-emitting section that emits light of different colors according to operation modes.

As shown in the figure, an input apparatus 400 includes, for example, a light-transmitting section 401 in its casing 410. The light-transmitting section 401 may be, for example, an opening formed in the casing 410, or a resin material having translucency may be disposed at the opening formed in the casing 410. The light-transmitting section 401 is formed between, for example, the button 11 and the button 13. A plurality of LEDs (Light Emitting Diodes) 402, 403, and 404 that emit light of different colors are mounted on the circuit board 25. Based on a result of the judgment of the operation mode received from the MPU 60, the MPU 50 performs switching among power supply switches (not shown) for the LEDs 402, 403, and 404. When the input apparatus 400 is, for example, in the active mode (Active), the power supply switch for the LED 402 is turned on so that the LED 402 that emits green light emits light, and the power supply switches for the LEDs 403 and 404 are turned off. When the input apparatus 400 is, for example, in the sleep 1 mode (Sleep 1), the power supply switch for the LED 403 is turned on so that the LED 403 that emits yellow light emits light, and the power supply switches for the LED 402 and the LED 404 are turned off. When the input apparatus 400 is, for example, in the sleep 2 mode (Sleep 2), the power supply switch for the LED 404 is turned on so that the LED 404 that emits red light emits light, and the power supply switches for the LED 402 and the LED 403 are turned off.

The structure as described above can cause the light-transmitting section 401 to emit green light when the input apparatus 400 is in the active mode (Active), cause the light-transmitting section 401 to emit yellow light in the sleep 1 mode (Sleep 1), and cause the light-transmitting section 401 to emit red light in the sleep 2 mode (Sleep 2). Therefore, the user can visually and easily determine which operation mode the input apparatus 400 is in.

It should be noted that the place where the light-transmitting section 401 is disposed, the number thereof, and the like are not particularly limited as long as the user who is using the input apparatus 400 can see the light-transmitting section.

In the above embodiments, the user is notified of the operation mode by differentiating the emission color of the light-transmitting section 401 according to the operation mode. However, without being limited thereto, for example, it is also possible that the input apparatus includes one LED, and the MPU 50 controls the light-transmitting section 401 so that light is emitted in emission patterns that vary depending on the operation modes (for example, at a temporally different emission timing of the LED). In this case, the number of LEDs can be reduced, so while reducing cost and size of the input apparatus, the operation mode of the input apparatus can be visually determined.

Figure 32:
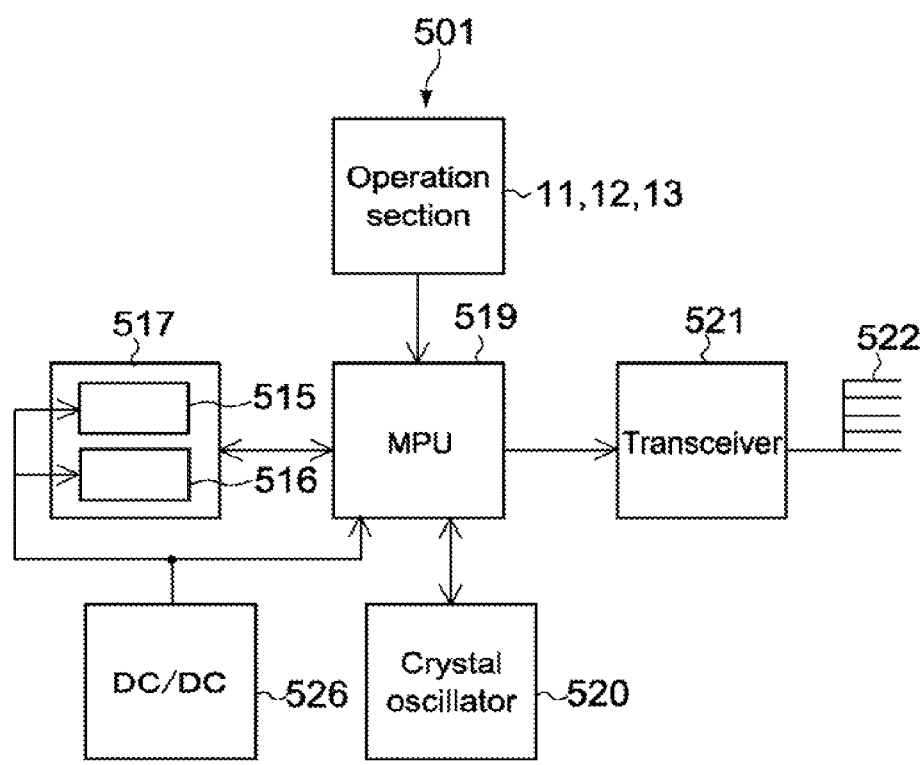
FIG. 32 is a block diagram showing an electrical structure of another input apparatus.

FIG. 32 is a block diagram showing an electrical structure of another input apparatus.

A sensor unit 517 includes an angular velocity sensor unit (gyro sensor unit) 515 for detecting angular velocities about two orthogonal axes. The sensor unit 517 further includes an acceleration sensor unit 516 for detecting accelerations along two axes at mutually different angles, that is, along two orthogonal axes (X axis and Y axis), for example.

An MPU 519 (movement value generation means, execution means, and judgment means) includes built-in volatile and nonvolatile memories requisite therefor as shown in FIG. 32. The MPU 519 is input with detection signals from the sensor unit 517, operation signals from an operation section, and the like, and in response to those input signals, performs various kinds of operational processing and the like to generate control signals such as a trigger signal to be described later.

The MPU 519 performs control so as to set, out of the angular velocity sensor unit 515 and the acceleration sensor unit 516, the acceleration sensor unit 516 whose power consumption is smaller in the power-saving mode to the power-saving mode, and restrict supply of power to the angular velocity sensor unit 515. The MPU 519 performs control to detect the trigger for restoration from the power-saving mode to the normal mode by using the acceleration sensor unit 516 set to the power-saving mode in the power-saving mode. Based on the trigger, the MPU 519 performs control to restore itself from the power-saving mode to the normal mode.

A crystal oscillator 520 generates clocks and supplies them to the MPU 519. As batteries, dry cell batteries, rechargeable batteries, or the like are used.

A transceiver 521 transmits the control signals (input information) generated by the MPU 519 as RF radio signals to a control apparatus 540 via an antenna 522.

After power supply voltage is stabilized via a DC-DC converter 526, the power is supplied to the sensor unit 517 and the MPU 519 in the normal mode, and in the power-saving mode, the supply of power to the angular velocity sensor unit 515 is stopped by a FET (not shown), and the power is supplied to the acceleration sensor unit 516 in the power-saving mode.

Next, a switching operation between modes (power-saving mode, normal mode) performed by the input apparatus 501 will be described.

Figure 33:
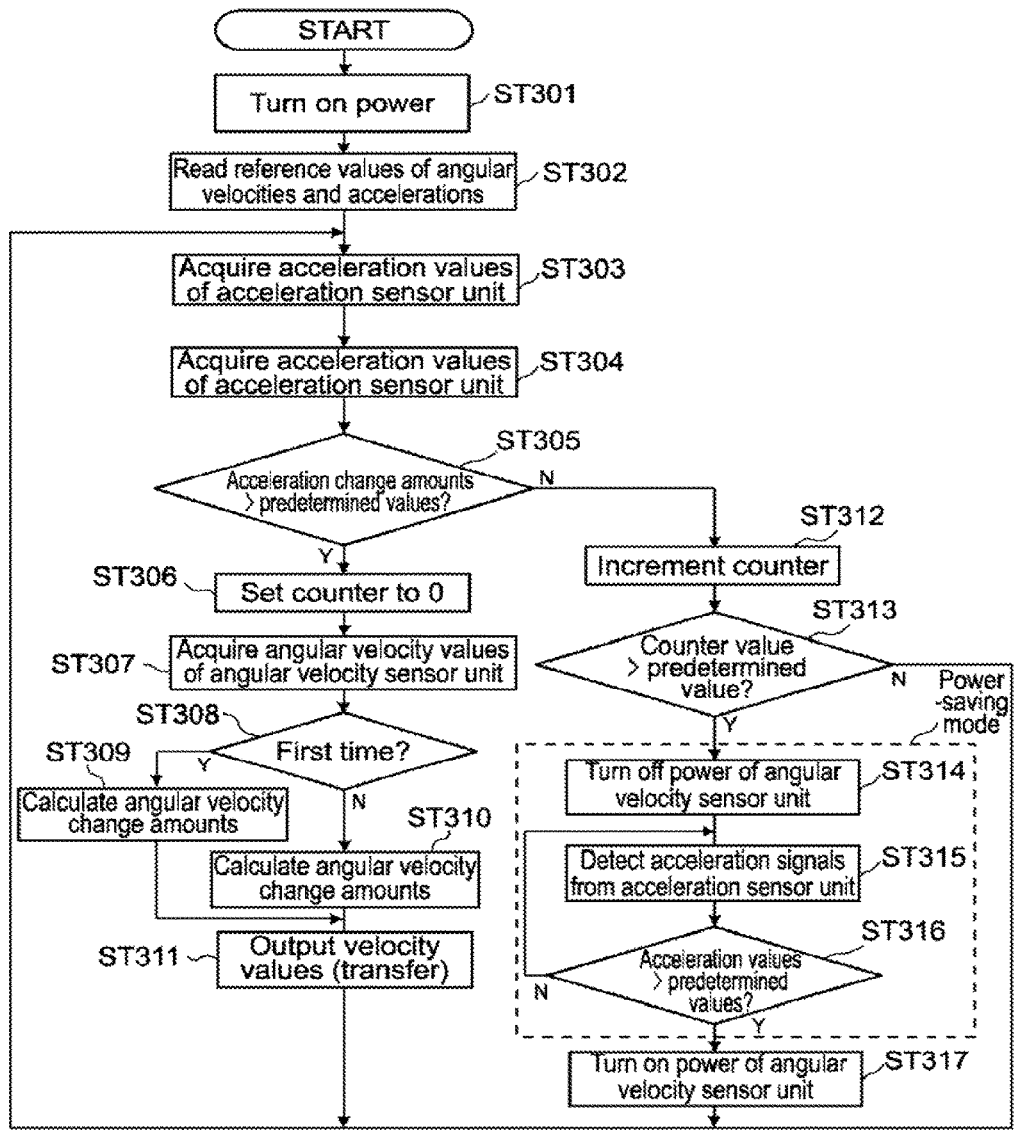
FIG. 33 is a flowchart of a mode switching operation of the input apparatus.

FIG. 33 is a flowchart of the switching operation between modes (power-saving mode, normal mode) performed by the input apparatus 501.

As shown in FIG. 33, first, a switch (power) (not shown) is turned on (ST301), and reference zero voltages recorded in the built-in volatile memory of the MPU 519 are read as reference values (ST302). Because there are individual differences in output voltage values for the acceleration sensor and the gyro sensor at an acceleration 0 or an angular velocity 0, the reference zero voltage calibrated in a factory production adjustment process is used as a reference.

Then, with the configuration as the acceleration sensor, acceleration signals are acquired from the acceleration sensor unit 516 as shown in Step 101a of FIG. 11, and acceleration values are calculated (ST303).

Subsequently, after a predetermined number of clocks, as in Step 303, acceleration signals are acquired from the acceleration sensor unit 516, and acceleration values are calculated (ST304).

Then, it is judged whether or not change amounts between the acceleration values obtained in Step 303 and the acceleration values obtained in Step 304 are larger than predetermined values (ST305). Values close to zero are set as the predetermined values.

When the change amounts between the acceleration values are larger than the predetermined values in Step 305, it is judged that the input apparatus 501 is moving, and a counter value is set to 0 (ST306). Here, the configuration is used as the angular velocity sensor.

Subsequently, angular velocity signals from the angular velocity sensor unit 515 are detected, and angular velocity values are calculated (acquired) (ST307).

It is judged whether or not the number of times the angular velocity values are calculated (acquired) is once (ST308), and in the case of once, by a comparison with the reference values acquired in Step 302, change amounts of the angular velocity values are calculated (ST309).

When the number of times the angular velocity values are calculated (acquired) is not once, by comparing the angular velocity values obtained last time and the currently-obtained angular velocity values, change amounts of the angular velocity values are calculated (ST310).

Then, using the change amounts of the angular velocity values obtained in Step 309 or Step 310, the acceleration values obtained in Step 304 are corrected and integrated to obtain the velocity values as in the above embodiment (Steps 103 to 116 of FIG. 11), which are then output to the control apparatus 40 (ST311). It should be noted that a transmission interrupt is caused by switching a MOSION signal between high and low before and after Step 311.

On the other hand, when the change amounts of the acceleration values are equal to or smaller than the predetermined values in Step 305, the counter value is incremented by 1 (ST312).

Then, it is judged whether or not the counter value is larger than a predetermined value (for example, 1000) (ST313). This predetermined value is a value for determining the time required for a shift from the normal mode to the power-saving mode and can be set arbitrarily.

When the counter value is equal to or smaller than the predetermined value in Step 313, the process returns to Step 303.

When the counter value is larger than the predetermined value in Step 313, the input apparatus 501 is judged as being in a still condition, and thus the supply of power to the angular velocity sensor unit 515 is stopped, and the acceleration sensor unit 516 is brought into the power-saving mode (power-saving mode) (ST314). That is, in the power-saving mode, a standby current smaller than that in the normal mode is flowing in the MPU 519 and the acceleration sensor unit 516 in order to detect the trigger for restoration to the normal mode.

Then, the acceleration signals from the acceleration sensor unit 516 are detected (ST315).

Next, it is judged whether acceleration values obtained from the acceleration signals are larger than predetermined values (ST316).

When the acceleration values are equal to or smaller than the predetermined values, the input apparatus 501 is judged as being in the still condition, and thus the process returns to Step 315, and the acceleration detection is continued.

When the acceleration values are larger than the predetermined values, the input apparatus 501 is judged as being in a moving condition, and thus the supply of power to the angular velocity sensor unit 515 is resumed (ST317), the acceleration sensor unit 516 and the like are restored to the normal mode, and the process returns to Step 303.

As described above, the supply of power to the angular velocity sensor unit 515 is stopped while the input apparatus 501 is not operated (put on a table, put on a sofa, and the like) (in the power-saving mode), so power consumption in the power-saving mode can be reduced. Further, at this time, a current smaller than that in the normal mode is passed through the acceleration sensor unit 516 whose power consumption is low even in the power-saving mode, the acceleration signals are detected by the acceleration sensor unit 516 when an acceleration acts on the input apparatus 501 (ST315), and when the obtained acceleration values are larger than the predetermined values (ST316), using this as the trigger, a restoration to the normal mode is performed (ST317), whereby the electric power consumed can be effectively reduced, and also, for example, when held in the user's hand and used again, an immediate shift to the normal mode can be performed. Therefore, it is possible to effectively reduce electric power consumed by the input apparatus 501, thereby extending battery life.

Specifically, the acceleration sensor unit 516 is a passive type sensor whose consumption current is about 0.2 mA to 1 mA at 3 V drive. On the other hand, the angular velocity sensor unit 515 includes a mechanically-vibrated vibrator (not shown) and needs to constantly vibrate the vibrator to generate Coriolis force. To use the angular velocity sensor as a trigger for restoration from the power-saving mode, the driving circuit needs to be kept operated. The consumption current of the angular velocity sensor driven at 3 V is about 6 mA to 12 mA, which is larger than that of the acceleration sensor unit 516. In other words, by switching to the power-saving mode, the consumption current can be reduced to about 1/30 to 1/12 compared to the normal mode. Moreover, when the power supply voltage is 3.3 V, the consumption current of the acceleration sensor unit 516 is 0.3 mA, and the consumption current of the angular velocity sensor unit 515 is 7 mA, the consumption current can be reduced to 1/23 by making a switch to the power-saving mode.

It should be noted that the example in which, when the input apparatus 501 is in the still condition, the supply of power to the angular velocity sensor unit 515 is stopped and the acceleration sensor unit 516 is brought into the power-saving mode (power-saving mode) (ST314) has been shown. However, without being limited thereto, for example, it is also possible that when both the angular velocity sensor unit 515 and the acceleration sensor unit 516 can be brought into the power-saving condition, out of the angular velocity sensor unit 515 and the acceleration sensor unit 516, a sensor whose power consumption in the power-saving condition is lower is brought into the power-saving condition, and the supply of power to the sensor other than the sensor in the power-saving condition is stopped.

Moreover, in the power-saving mode, the MPU 519 sets itself to the power-saving mode. The power-saving mode at this time is, for example, a condition where the supply of electric power to circuits required for output processing of the angular velocity sensor unit 515 is stopped. Accordingly, electric power consumed by the MPU 519 can be cut down.

Figure 34:
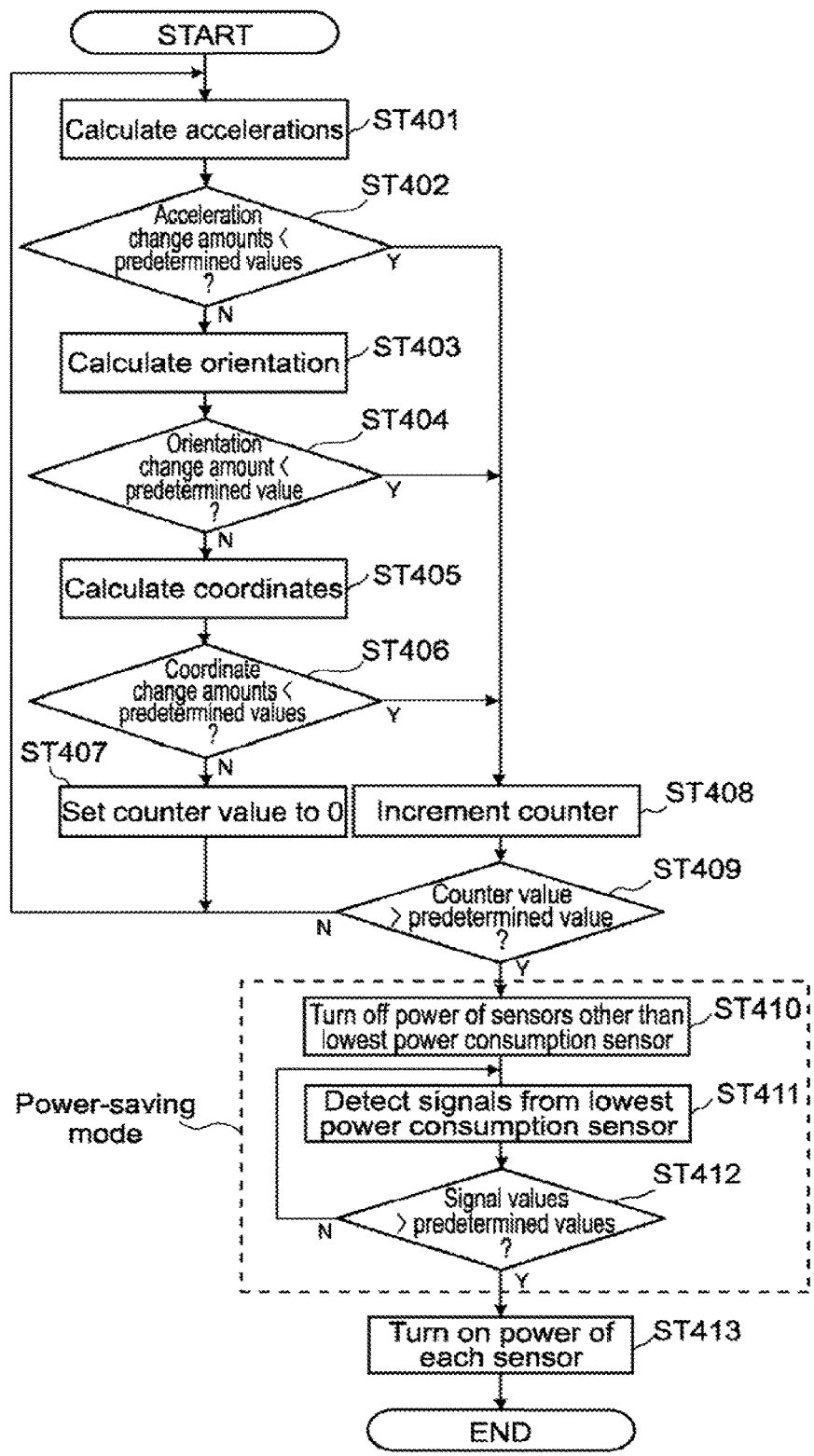
FIG. 34 is a flowchart for illustrating a mode switching operation of this embodiment.

Hereinafter, a specific description will be given on an operation with a particular emphasis on the sensors of the cellular phone 200, on the basis of a flowchart shown in FIG. 34.

First, as in the above embodiments, the acceleration values of the cellular phone 200 are calculated (ST401).

Next, by comparing acceleration values obtained last time in Step 401 and the acceleration values currently obtained in Step 401, it is judged whether or not change amounts are smaller than predetermined values (ST402). It should be noted that initial values of the acceleration values are set to 0 in a correction condition where a gravity acceleration 1G is excluded (the same holds true for descriptions below).

When the change amounts are not smaller than the predetermined values, an orientation is calculated by the geomagnetic orientation sensor 208 (ST403).

Then, by comparing an orientation obtained last time in Step 403 and the orientation currently obtained in Step 403, it is judged whether or not a change amount is smaller than a predetermined value (ST404).

When the change amount is not smaller than the predetermined value, coordinates of the cellular phone 200 are calculated by the GPS sensor 209 (ST405).

Next, by comparing coordinates obtained last time in Step 405 and the coordinates currently obtained in Step 405, it is judged whether or not change amounts are smaller than predetermined values (ST406).

When the change amounts are not smaller than the predetermined values, the cellular phone 200 is judged as being moved, the counter value is set to zero (ST407), and the process returns to Step 401.

When the change amounts are smaller than the predetermined values in Steps 402, 404, and 406, the cellular phone 200 is judged to be in the still condition, and the counter value is incremented by 1 (ST408).

Then, it is judged whether or not the counter value is larger than a predetermined value (for example, 1000) (ST409).

When the counter value is equal to or smaller than the predetermined value in Step 409, the process returns to Step 401.

When the counter value is larger than the predetermined value in Step 409, the cellular phone 200 is judged to be in the still condition, a sensor whose power consumption in the power-saving mode is the lowest out of the geomagnetic orientation sensor 208, the GPS sensor 209, the acceleration sensor 210, and the angular velocity sensor (gyro sensor) 211, such as the acceleration sensor 210, for example, is set to the power-saving mode, and the supply of power to the other sensors is stopped (ST410). In the power-saving mode, a standby current smaller than that in the normal mode is flowing in the multimedia processor 201, the communication processor 202, and the sensor whose power consumption in the power-saving mode is the lowest like the acceleration sensor 210, for example, for restoration to the normal mode.

Then, signals from the sensor whose power consumption in the power-saving mode is the lowest like the acceleration sensor 210, for example, are detected (ST411).

After that, it is judged whether or not the detected signal values are larger than predetermined values (ST412).

When the signal values are smaller than the predetermined values, the cellular phone 200 is judged to be in the still condition, the process returns to Step 410, and the detection of the signals is continued.

When the signal values are larger than the predetermined values, the cellular phone 200 is judged, for example, to be in a condition applied with an acceleration, the supply of power to sensors other than the sensor whose power consumption in the power-saving mode is the lowest like the acceleration sensor 210, for example, is resumed (ST413), a current in the normal mode is passed through the acceleration sensor 210, and restoration is made to the normal mode.

As described above, when setting the power-saving mode, control is performed such that out of the geomagnetic orientation sensor 208, the GPS sensor 209, the acceleration sensor 210, and the angular velocity sensor (gyro sensor) 211, the sensor whose power consumption in the power-saving mode is the lowest like the acceleration sensor 210, for example, is set to the power-saving mode, and the supply of power to the other sensors is stopped (ST410).

With the structure as described above, in the power-saving mode, electronic power is not consumed in sensors other than the sensor whose power consumption is the lowest like the acceleration sensor 210, for example, the power is supplied to the sensor whose power consumption in the power-saving mode is the lowest, signals of accelerations acting on the cellular phone 200 are detected by the sensor whose power consumption is the lowest like the acceleration sensor 210 (ST411), for example, and when the obtained signal values are larger than the predetermined values (ST412), with this as a trigger, a restoration to the normal mode is performed (ST413), whereby electric power consumed can be suppressed.

The communication processor 202 makes a transition to the power-saving mode according to the time elapsed since having become stationary and sets itself to the power-saving condition. The power-saving condition of the communication processor 202 at this time is, for example, a condition where the reception cycle of signals from the multimedia processor 201 is longer than that in the normal mode. Accordingly, electric power consumed by the communication processor 202 can be cut down.

The communication processor 202 makes a transition to the power-saving mode according to the time elapsed since having become stationary and sets itself to the power-saving condition. The power-saving condition of the communication processor 202 at this time is, for example, a condition where a standby current necessary to receive the report event (Report Event) from the multimedia processor 201 is flowing in the communication processor 202. Accordingly, the electric power consumed by the communication processor 202 can be cut down.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. An apparatus comprising:
    circuitry configured to:
        set an operating state of a specific sensor, which includes an optical sensor configured to acquire an image of a surrounding view of the apparatus, to either a first operating state or a second operating state, wherein power supplied to the specific sensor in the second operating state is higher than power supplied to the specific sensor in the first operating state;
        control an energy source to supply, to a motion sensor, enough power to cause the motion sensor to send a motion signal while the specific sensor is in the first operating state, wherein the motion sensor has a consumption current lower than that of the specific sensor;
        set the specific sensor to the first operating state based on the motion signal during a predetermined time period;
        receive the motion signal from the motion sensor; and
        change the operating state of the specific sensor from the first operating state to the second operating state based on the received motion signal.

2. The apparatus according to claim 1,
    wherein the specific sensor includes at least one of an infrared sensor, a gyro sensor, or a touch sensor.

3. The apparatus according to claim 2,
    wherein the apparatus is a mobile device,
    wherein the specific sensor includes the touch sensor, and
    wherein the motion sensor includes at least one of the gyro sensor or the acceleration sensor.

4. The apparatus according to claim 3,
    wherein the circuitry is configured to:
        determine whether the mobile device is operated based on the motion signal; and
        change the operating state of the specific sensor from the first operating state to the second operating state based on the determination that the mobile device is operated.

5. The apparatus according to claim 3,
    wherein the circuitry is configured to:
        determine whether the motion signal is equal to or more than a predetermined value;
        determine whether the mobile device is in a moving condition based on the determination that the motion signal is equal to or more than the predetermined value; and
        change the operating state of the specific sensor from the first operating state to the second operating state based on the moving condition.

6. The apparatus according to claim 1, wherein the motion sensor is at least one of a gyro sensor, an acceleration sensor, a geomagnetic sensor, an infrared sensor, a pressure sensor, a GPS sensor, or a rotary encoder.

7. The apparatus according to claim 6,
    wherein the motion sensor includes at least one of the gyro sensor, the acceleration sensor, or the rotary encoder.

8. The apparatus according to claim 7,
    wherein the circuitry is configured to:
        determine whether the motion signal is lower than a predetermined value;
        determine whether the apparatus is in a still condition based on the determination that the motion signal is lower than the predetermined value; and
        change the operating state of the optical sensor from the second operating state to the first operating state based on the still condition.

9. The apparatus according to claim 8,
    wherein the circuitry is configured to determine whether the apparatus is moved by a user based on the acquired image.

10. The apparatus according to claim 8,
    wherein the circuitry is configured to determine whether a specific object is in the acquired image.

11. The apparatus according to claim 8,
    wherein the circuitry is configured to determine a surrounding landscape based on the acquired image and location data.

12. The apparatus according to claim 7,
    wherein the apparatus is an autonomous travel system for an automobile,
    wherein the autonomous travel system includes the circuitry, the optical sensor, the motion sensor, and the power source, and
    wherein the circuitry is configured to perform autonomous traveling based on the acquired image.

13. The apparatus according to claim 1, further comprising
    the specific sensor connected to the circuitry;
    the motion sensor connected to the circuitry; and
    the power source configured to supply power to the circuitry, the specific sensor, and the motion sensor.

14. The apparatus according to claim 13, further comprising an indicator configured to indicate the operating state of the specific sensor with a light.

15. An apparatus comprising:
    a specific sensor configured to detect an object motion, wherein the specific sensor includes an optical sensor configured to acquire an image of a surrounding view of the apparatus;
    an energy source configured to supply power to the specific sensor; and
    circuitry configured to:
        set an operating state of the specific sensor to either a first operating state or a second operating state, wherein power supplied to the image sensor in the second operating state is higher than power supplied to the image sensor in the first operating state;
        set the specific sensor to the first operating state based on the motion signal during a predetermined time period; and
        change the operating state of the specific sensor from the first operating state to the second operating state based on the detected object motion.

16. A power-saving control method, comprising:
setting an operating state of a specific sensor, which includes an optical sensor configured to acquire an image of a surrounding view of the apparatus, to a first operating state, wherein the operating state is either the first operating state or a second operating state,
controlling power supplied to the specific sensor in the first operating state to become lower than power supplied to the specific sensor in the second operating state;
controlling an energy source to supply, to a motion sensor, enough power to cause the motion sensor to send a motion signal while the specific sensor is in the first operating state, wherein the motion sensor has a consumption current lower than that of the specific sensor;
set the specific sensor to the first operating state based on the motion signal during a predetermined time period; and
changing the operating state of the specific sensor from the first operating state to the second operating state based on the received motion signal.

* * * * *